US010739149B2

(12) United States Patent
Chase et al.

(10) Patent No.: US 10,739,149 B2
(45) Date of Patent: Aug. 11, 2020

(54) AUTONOMOUS VEHICLE ENHANCEMENT SYSTEM

(71) Applicants: Arnold Chase, West Hartford, CT (US); William Chase, West Hartford, CT (US)

(72) Inventors: Arnold Chase, West Hartford, CT (US); William Chase, West Hartford, CT (US)

(*) Notice: Subject to any disclaimer, the term of this patent is extended or adjusted under 35 U.S.C. 154(b) by 147 days.

(21) Appl. No.: 15/973,987

(22) Filed: May 8, 2018

(65) Prior Publication Data

US 2018/0321688 A1 Nov. 8, 2018

Related U.S. Application Data

(60) Provisional application No. 62/502,817, filed on May 8, 2017.

(51) Int. Cl.
*G01C 21/34* (2006.01)
*G05D 1/02* (2020.01)
(Continued)

(52) U.S. Cl.
CPC ..... *G01C 21/3438* (2013.01); *G01C 21/3492* (2013.01); *G05D 1/0022* (2013.01);
(Continued)

(58) Field of Classification Search
CPC . G01C 21/3438; G01C 21/3492; H04W 4/44; H04W 12/06; H04W 4/90;
(Continued)

(56) References Cited

U.S. PATENT DOCUMENTS 5,168,451 A 12/1992 Bolger
7,986,126 B1 7/2011 Bucci et al.
(Continued)

FOREIGN PATENT DOCUMENTS

WO 2013164660 A1 11/2013

OTHER PUBLICATIONS

Karfopoulos et al., "A Multi-Agent System for Controlled Charging of a Large Population of Electric Vehicles", IEEE Transactions on Power Systems, vol. 28 (2), May 2013, p. 1196-1204, Sep. 11, 2012.
(Continued)

*Primary Examiner* — Calvin Cheung
(74) *Attorney, Agent, or Firm* — McCormick, Paulding & Huber PLLC

(57) ABSTRACT

The present application is directed to an Autonomous Vehicle Enhancement System (AVES) and method for monitoring and managing a virtual or existing fleet of autonomous vehicles in a transportation network and dispatching the autonomous vehicles to users. The AVES includes an AVES Central Operations Center (COC) that communicates with AVES vehicle equipment installed in the autonomous vehicles and AVES applications installed on computing devices accessible by the users. The AVES improves the operating efficiency of a transportation network by monitoring the condition of autonomous vehicles, optimizing the geographical distribution of the autonomous vehicles and optimizing assignment of the autonomous vehicles to users requesting services. The AVES COC monitors and controls the autonomous vehicles via the AVES vehicle equipment. The AVES COC communicates with the users via the AVES applications to provide services to the users. The AVES vehicle equipment and the AVES applications installed on the computing devices communicate with each other to fulfill user request for services.

56 Claims, 5 Drawing Sheets

(51) Int. Cl.

| | | |
|---|---|---|
| *G08G 1/00* | (2006.01) | |
| *G07C 5/00* | (2006.01) | |
| *G06Q 10/02* | (2012.01) | |
| *G06Q 50/30* | (2012.01) | |
| *G06N 5/00* | (2006.01) | |
| *H04W 4/44* | (2018.01) | |
| *G06N 20/00* | (2019.01) | |
| *G06F 15/76* | (2006.01) | |
| *H04W 12/06* | (2009.01) | |
| *G05D 1/00* | (2006.01) | |
| *G06N 5/02* | (2006.01) | |
| *G06Q 10/06* | (2012.01) | |
| *G06K 9/00* | (2006.01) | |
| *G10L 15/22* | (2006.01) | |
| *G08G 1/01* | (2006.01) | |
| *G08G 1/017* | (2006.01) | |
| *H04W 12/00* | (2009.01) | |
| *G06F 3/0481* | (2013.01) | |
| *G06F 3/0488* | (2013.01) | |
| *H04L 29/06* | (2006.01) | |
| *H04N 7/18* | (2006.01) | |
| *H04W 4/90* | (2018.01) | |

(52) U.S. Cl.
CPC ........ *G05D 1/0027* (2013.01); *G05D 1/0055* (2013.01); *G05D 1/0088* (2013.01); *G05D 1/0276* (2013.01); *G05D 1/0291* (2013.01); *G05D 1/0297* (2013.01); *G06F 15/76* (2013.01); *G06K 9/00832* (2013.01); *G06N 5/003* (2013.01); *G06N 5/022* (2013.01); *G06N 20/00* (2019.01); *G06Q 10/02* (2013.01); *G06Q 10/06311* (2013.01); *G06Q 50/30* (2013.01); *G07C 5/008* (2013.01); *G08G 1/012* (2013.01); *G08G 1/0175* (2013.01); *G08G 1/202* (2013.01); *G10L 15/22* (2013.01); *H04W 4/44* (2018.02); *H04W 12/06* (2013.01); *G05D 1/0212* (2013.01); *G05D 2201/0212* (2013.01); *G05D 2201/0213* (2013.01); *G06F 3/0481* (2013.01); *G06F 3/0488* (2013.01); *G06N 5/02* (2013.01); *G10L 2015/223* (2013.01); *H04L 63/08* (2013.01); *H04L 63/083* (2013.01); *H04N 7/188* (2013.01); *H04W 4/90* (2018.02); *H04W 12/00514* (2019.01)

(58) Field of Classification Search
CPC . H04W 12/00514; G06N 20/00; G06N 5/003; G06N 5/022; G06N 5/02; G05D 1/0022; G05D 1/0027; G05D 1/0055; G05D 1/0088; G05D 1/0276; G05D 1/0291; G05D 1/0297; G05D 1/0212; G05D 2201/0212; G05D 2201/0213; G06F 15/76; G06F 3/0481; G06F 3/0488; G06K 9/00832; G06Q 10/02; G06Q 10/06311; G06Q 50/30; G07C 5/008; G08G 1/012; G08G 1/0175; G08G 1/202; G10L 15/22; G10L 2015/223; H04L 63/08; H04L 63/083; H04N 7/188
See application file for complete search history.

(56) References Cited

U.S. PATENT DOCUMENTS

| | | |
|---|---|---|
| 8,630,897 B1 | 1/2014 | Prada Gomez et al. |
| 9,387,928 B1 | 7/2016 | Gentry et al. |
| 9,412,280 B1 | 8/2016 | Zwillinger et al. |
| 9,599,477 B1 | 3/2017 | Aula et al. |
| 9,606,539 B1 | 3/2017 | Kentley et al. |
| 9,715,233 B1* | 7/2017 | Mandeville-Clarke ..................... H04L 67/20 |
| 9,836,057 B2* | 12/2017 | Fairfield ............... H04W 4/029 |
| 9,953,283 B2* | 4/2018 | Sweeney .............. G05D 1/0022 |
| 9,953,539 B1* | 4/2018 | Gkiotsalitis ........... G08G 1/202 |
| 10,036,641 B1 | 7/2018 | Iland et al. |
| 10,082,793 B1* | 9/2018 | Glaser ................ G01C 21/3423 |
| 10,147,325 B1* | 12/2018 | Copeland ................ H04W 4/02 |
| 10,423,934 B1* | 9/2019 | Zanghi .................. G06Q 10/20 |
| 10,501,055 B1* | 12/2019 | Yi ..................... H04W 12/0401 |
| 2004/0177109 A1 | 9/2004 | Lee |
| 2005/0108089 A1 | 5/2005 | Ehrman et al. |
| 2009/0088924 A1 | 4/2009 | Coffee et al. |
| 2009/0313077 A1* | 12/2009 | Wheeler, IV .......... G01C 21/26 705/7.14 |
| 2010/0023195 A1 | 1/2010 | Traster |
| 2010/0161481 A1 | 6/2010 | Littrell |
| 2012/0078672 A1 | 3/2012 | Mohebbi et al. |
| 2012/0098483 A1 | 4/2012 | Patel |
| 2012/0106801 A1 | 5/2012 | Jackson |
| 2012/0200259 A1 | 8/2012 | Sullivan et al. |
| 2012/0280653 A1 | 11/2012 | Prosser et al. |
| 2012/0330494 A1 | 12/2012 | Hendrix et al. |
| 2013/0214737 A1 | 8/2013 | Wu et al. |
| 2014/0026065 A1 | 1/2014 | Wang |
| 2014/0129143 A1* | 5/2014 | Dave .................. G01C 21/3407 701/537 |
| 2014/0132207 A1 | 5/2014 | Fisher |
| 2014/0136414 A1 | 5/2014 | Abhyanker |
| 2014/0156556 A1 | 6/2014 | Lavian et al. |
| 2014/0222298 A1 | 8/2014 | Gurin |
| 2014/0358353 A1 | 12/2014 | Ibanez-Guzman et al. |
| 2015/0015193 A1 | 1/2015 | Oman et al. |
| 2015/0035685 A1 | 2/2015 | Strickland et al. |
| 2015/0081362 A1 | 3/2015 | Chadwick et al. |
| 2015/0206357 A1 | 7/2015 | Chen et al. |
| 2015/0336270 A1 | 11/2015 | Storr |
| 2015/0345951 A1 | 12/2015 | Dutta et al. |
| 2016/0001883 A1 | 1/2016 | Sanz et al. |
| 2016/0027306 A1 | 1/2016 | Lambert et al. |
| 2016/0117610 A1 | 4/2016 | Ikeda et al. |
| 2016/0138928 A1 | 5/2016 | Guo et al. |
| 2016/0139594 A1 | 5/2016 | Okumura et al. |
| 2016/0161266 A1 | 6/2016 | Crawford et al. |
| 2016/0171574 A1 | 6/2016 | Paulucci et al. |
| 2016/0176307 A1 | 6/2016 | Becker |
| 2016/0209220 A1* | 7/2016 | Laetz .................... G08G 1/202 |
| 2016/0301698 A1 | 10/2016 | Katara et al. |
| 2016/0301808 A1 | 10/2016 | Choi et al. |
| 2016/0303969 A1 | 10/2016 | Akula |
| 2016/0321566 A1 | 11/2016 | Liu et al. |
| 2016/0321771 A1 | 11/2016 | Liu et al. |
| 2016/0334797 A1* | 11/2016 | Ross .................... G05D 1/0234 |
| 2016/0342915 A1* | 11/2016 | Humphrey ....... G06Q 10/06313 |
| 2016/0351056 A1 | 12/2016 | Herbach et al. |
| 2016/0370194 A1* | 12/2016 | Colijn ................... G08G 1/202 |
| 2017/0050749 A1 | 2/2017 | Pilskalns |
| 2017/0052034 A1 | 2/2017 | Magazinik et al. |
| 2017/0060129 A1 | 3/2017 | Ross et al. |
| 2017/0102243 A1 | 4/2017 | Samocha et al. |
| 2017/0103490 A1 | 4/2017 | Haparnas et al. |
| 2017/0123421 A1* | 5/2017 | Kentley ................. G01S 17/87 |
| 2017/0124506 A1 | 5/2017 | Khan |
| 2017/0132934 A1 | 5/2017 | Kentley et al. |
| 2017/0147959 A1 | 5/2017 | Sweeney et al. |
| 2017/0213165 A1 | 7/2017 | Stauffer et al. |
| 2017/0269940 A1 | 9/2017 | Valasek et al. |
| 2017/0344023 A1* | 11/2017 | Laubinger ............. B60W 50/14 |
| 2018/0060827 A1 | 3/2018 | Abbas et al. |
| 2018/0075754 A1* | 3/2018 | Salter ..................... H04W 4/42 |
| 2018/0108103 A1 | 4/2018 | Li et al. |
| 2018/0150772 A1 | 5/2018 | Ryan et al. |
| 2018/0188731 A1* | 7/2018 | Matthiesen ........... G06Q 10/02 |
| 2018/0202822 A1 | 7/2018 | DeLizio |
| 2018/0211541 A1* | 7/2018 | Rakah ................... G06Q 50/30 |
| 2018/0253109 A1* | 9/2018 | Fontaine ............... G05D 1/0291 |
| 2018/0308191 A1 | 10/2018 | Matthiesen et al. |

(56) References Cited

U.S. PATENT DOCUMENTS

| | | | |
|---|---|---|---|
| 2018/0323816 A1 | 11/2018 | Chaston et al. | |
| 2019/0079521 A1* | 3/2019 | Blum | G05D 1/0088 |
| 2019/0137290 A1* | 5/2019 | Levy | G05D 1/0214 |
| 2019/0197325 A1* | 6/2019 | Reiley | G06Q 10/06 |
| 2019/0197798 A1* | 6/2019 | Abari | G06N 20/00 |
| 2019/0228375 A1* | 7/2019 | Laury | G06Q 10/047 |
| 2019/0228646 A1 | 7/2019 | Bermudez | |
| 2019/0251496 A1* | 8/2019 | DaCosta | G01C 21/343 |
| 2019/0265703 A1* | 8/2019 | Hicok | G05B 13/027 |
| 2019/0318159 A1* | 10/2019 | Blanc-Paques | G06Q 50/30 |
| 2019/0358818 A1* | 11/2019 | Kanitz | B25J 9/1697 |

OTHER PUBLICATIONS

Chen et al., "Operations of a shared, autonomous, electric vehicle fleet: Implications of vehicle & charging infrastructure decisions." In: Transportation Research Part A: Policy and Practice. Dec. 2016 (Dec. 2016) Retrieved from <https://pdfs.semanticscholar.org/65e1/f6dc55122accfcdc3cabcdba5f6da35b2492.pdf> entire document.

International Search Report for International Application No. PCT/US2018/031617 dated Jul. 23, 2018.

Written Opinion for International Application No. PCT/US2018/031617 dated Jul. 23, 2018.

International Search Report for International Application No. PCT/US2018/031626 dated Jul. 13, 2018.

Written Opinion for International Application No. PCT/US2018/031626 dated Jul. 13, 2018.

International Search Report for International Application No. PCT/US2018/031637 dated Jul. 23, 2018.

Written Opinion for International Application No. PCT/US2018/031637 dated Jul. 23, 2018.

International Search Report for International Application No. PCT/US2018/031647 dated Jul. 23, 2018.

Written Opinion for International Application No. PCT/US2018/031647 dated Jul. 23, 2018.

\* cited by examiner

AUTONOMOUS VEHICLE ENHANCEMENT SYSTEM

CROSS REFERENCE TO RELATED APPLICATIONS

This application claims the benefit under 35 U.S.C. § 119(e) of U.S. Provisional Application No. 62/502,817, filed on May 8, 2017, which is hereby incorporated by reference in its entirety.

The U.S. Patent Applications titled "Central Operations Center for Autonomous Vehicle Enhancement System," "Vehicle Equipment for Autonomous Vehicle Enhancement System," and "Mobile Device for Autonomous Vehicle Enhancement System," all filed on even date herewith, which also claim the benefit of U.S. Provisional Application No. 62/502,817, are herein incorporated by reference in their entireties.

TECHNICAL FIELD

The present application generally relates to augmenting the operation of autonomous vehicles, and more particularly relates to systems and methods for remotely monitoring and controlling a fleet of autonomous vehicles in a transportation network.

BACKGROUND OF THE INVENTION

Auto companies are developing autonomous vehicles for commercial and personal use on existing roadways for a variety of applications, including but not limited to personal taxi services, delivery services, etc. In the context of the present application, autonomous vehicle refers to a vehicle equipped with an automated driving system capable of performing all aspects of dynamic driving that can be managed by a human driver. It is envisioned that networks of autonomous vehicles will be available, similar to a network of taxis, buses or delivery vans, whereby a user can request an autonomous vehicle to pick-up, transport and drop off passengers, or pick-up, transport, and deliver packages, or the like. With different companies developing autonomous vehicles, existing autonomous vehicles have certain functional limitations at this early developmental stage of the technology because of a lack of standardization. It is desirable to provide a universal/generic solution to allow a transportation network company to remotely monitor and dynamically control different autonomous vehicles in its fleet to provide optimized consistent operation, functionality, safety and quality.

SUMMARY OF THE INVENTION

The present invention is directed to an Autonomous Vehicle Enhancement System (AVES) and method for dynamically monitoring and managing a fleet of registered autonomous vehicles in a transportation network and dispatching the autonomous vehicles in the fleet to registered users of the transportation network. The AVES includes an AVES Central Operations Center (COC) that is in operative communication with AVES vehicle equipment installed in each of the autonomous vehicles in the fleet and AVES applications installed on computing devices accessible by the users of the transportation network. The AVES maximizes the overall efficiency of the operations of a transportation network by monitoring the condition of autonomous vehicles in the fleet, optimizing the distribution of the fleet of autonomous vehicles throughout the transportation network's geographic area and dynamically optimizing assignment and re-assignment of the autonomous vehicles in the fleet to users requesting transportation services. The AVES COC monitors and controls the autonomous vehicles in the fleet via the AVES vehicle equipment. The AVES COC communicates with the users of the transportation network via the AVES applications installed on the computing devices to provide transportation network services to the users. The AVES vehicle equipment and the AVES applications installed on the computing devices communicate with each other to fulfill user request for transportation services.

In one embodiment of the present invention, an Autonomous Vehicle Enhancement System (AVES) and method of operating the AVES for managing a fleet of autonomous vehicles in a transportation network, includes AVES vehicle equipment installed on each autonomous vehicle and an AVES Central Operations Center (COC) in communication with the AVES vehicle equipment on each autonomous vehicle. The AVES COC monitors the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet. The AVES COC dynamically assigns autonomous vehicles in the fleet to an active pool if the autonomous vehicles are available, are in acceptable operational state, are in acceptable condition (based on pre-defined criteria) and have acceptable fuel/power-charge level (based on pre-defined criteria). The AVES COC receives trip requests from hailing users, selects or re-selects autonomous vehicles from the active pool to respond to trip requests and guides the selected autonomous vehicles to the hailing users. The AVES COC guides autonomous vehicles in the fleet, which are not in acceptable operational state or condition, to service locations for maintenance service. The AVES COC guides autonomous vehicles in the fleet, which do not have acceptable fuel/power-charge level, to fueling/power-charging stations for fueling/power-charging. The AVES COC guides autonomous vehicles in the active pool, which are not assigned to respond to trip requests from hailing users, to standby locations throughout the transportation network's geographic area.

In some of the embodiments of the above AVES and method of operating the AVES, the AVES COC comprises an Artificial Intelligence System including a knowledge base, and the Artificial Intelligence System executes a Vehicle Distribution Optimization Algorithm to determine optimal standby locations for the autonomous vehicles in the fleet.

In some of the embodiments of the above AVES and method of operating the AVES, the knowledge base includes at least one of real-time vehicle location data for the autonomous vehicles in the active pool, historical information regarding trip requests (including popular pick-up and drop-off locations), real-time information regarding trip requests and information regarding scheduled events in the transportation network's geographic area (e.g., concerts, sporting events, etc.), and the Vehicle Distribution Optimization Algorithm uses the knowledge base to determine standby locations for autonomous vehicles in the transportation network's geographic area to achieve a vehicle distribution that is optimally suited for fulfilling potential trip requests in an efficient and timely manner.

In some of the embodiments of the above AVES and method of operating the AVES, the real-time information regarding trip requests and information regarding scheduled events in the transportation network's geographic area are received by the AVES COC from public messaging systems and/or the AVES vehicle equipment installed on the autonomous vehicles in the fleet. The AVES COC can also recognize "popular" pick-up and drop-off locations based on an ongoing record of trip requests, and coordinated based on patterns related to the time of day (e.g., morning and evening rush-hour; the day (e.g., weekday or weekend); time of year (e.g., summer versus winter); or varying time durations (e.g., daily patterns, weekly patterns, or longer time frames).

In some of the embodiments of the above AVES and method of operating the AVES, the AVES COC comprises an Artificial Intelligence System including a knowledge base, and the Artificial Intelligence System executes the Matchmaking Algorithm by using the knowledge base to select autonomous vehicles from the active pool that are optimally suited to respond to the trip requests.

In some of the embodiments of the above AVES and method of operating the AVES, the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s) and vehicle description for each of the autonomous vehicles in the fleet.

In some of the embodiments of the above AVES and method of operating the AVES, the standby locations include fueling/power-charging stations, street parking spaces, parking garages, airports and bus stations, schools, and taxi queues.

In some of the embodiments of the above AVES and method of operating the AVES, the real-time vehicle availability of each autonomous vehicle in the fleet includes information regarding whether the autonomous vehicle is in the active pool, has been assigned to respond a trip request from a hailing user, is waiting or en route to pickup a hailing user for an assigned trip request, has picked up a hailing user for an assigned trip request or has dropped of a hailing user after completion of an assigned trip request.

In some of the embodiments of the above AVES and method of operating the AVES, the real-time vehicle operational state of each autonomous vehicle in the fleet includes information regarding the operational state of the mechanical and electrical systems of the autonomous vehicle, and the real-time vehicle condition of each autonomous vehicle in the fleet includes information regarding state of cleanliness of the autonomous vehicle.

In some of the embodiments of the above AVES and method of operating the AVES, the real-time vehicle fuel/power-charge level of each autonomous vehicle in the fleet includes information regarding at least one of a vehicle travel distance range, a percentage of fuel tank or electrical battery capacity available and units of available power or energy.

In some of the embodiments of the above AVES and method of operating the AVES, the AVES COC receives a unique vehicle ID, real-time vehicle location, real-time vehicle availability, real-time vehicle operational state, real-time vehicle condition and real-time vehicle fuel/power-charge level for each autonomous vehicle from the AVES vehicle equipment installed on each autonomous vehicle.

In some of the embodiments of the above AVES and method of operating the AVES, the AVES COC receives a trip request from a hailing user via a selected AVES application on a selected computing device, the trip request including a unique user ID associated with the hailing user and trip information including pickup location, pickup date/time, destination location, and any intermediate stop location(s), and the AVES COC determines a trip route based on the trip information for the trip request.

In some of the embodiments of the above AVES and method of operating the AVES, the AVES COC selects one of the autonomous vehicles to fulfill the trip request based on the trip route, real-time vehicle location, real-time vehicle availability, real-time vehicle operational state, real-time vehicle condition and real-time vehicle fuel/power-charge level.

In some of the embodiments of the above AVES and method of operating the AVES, the AVES COC generates a unique trip ID for the trip request, and associates the user ID for the hailing user and the vehicle ID for the selected autonomous vehicle with the unique trip ID, and the AVES COC sends the trip information and/or trip route to the AVES vehicle equipment of the selected autonomous vehicle to guide the selected autonomous vehicle to the pickup location at the pickup time.

In some of the embodiments of the above AVES and method of operating the AVES, the AVES COC comprises an Artificial Intelligence System including a knowledge base, and the Artificial Intelligence System executes a Route Determining Algorithm to determine the trip route for the trip request.

In some of the embodiments of the above AVES and method of operating the AVES, the knowledge base includes at least one of historical traffic conditions, real-time traffic conditions, scheduled road closures, scheduled events and scheduled construction, and the Artificial Intelligence System executes the Route Determining Algorithm by using the trip information and knowledge base to determine the trip route that is optimally suited for fulfilling the trip request.

In some of the embodiments of the above AVES and method of operating the AVES, the real-time traffic conditions, scheduled road closures, scheduled events and scheduled construction are received by the AVES COC from public messaging systems and/or the AVES vehicle equipment installed on the autonomous vehicles in the fleet.

In some of the embodiments of the above AVES and method of operating the AVES, the knowledge base includes user preference(s) and at least one of real-time vehicle location data, real-time vehicle availability data, real-time vehicle operational state data, real-time vehicle condition data, real-time vehicle fuel/power-charge level indication, vehicle owner specified restriction(s) and vehicle description for each of the autonomous vehicles in the fleet, and the Matchmaking Algorithm uses the determined trip route and knowledge base to select the autonomous vehicle that is optimally suited for fulfilling the trip request.

In some of the embodiments of the above AVES and method of operating the AVES, if, before the execution of a scheduled pickup date/time for the trip request, the Matchmaking Algorithm determines that a newly available autonomous vehicle is better suited for fulfilling the trip request than the previously selected autonomous vehicle, the Artificial Intelligence System selects the newly available autonomous vehicle to fulfill the trip request in lieu of the previously selected vehicle.

In some of the embodiments of the above AVES and method of operating the AVES, if the trip request exceeds an operational range of any available autonomous vehicle in the fleet, the AVES COC implements multi-hop routing to select and coordinate two or more autonomous vehicles to fulfill the trip request.

In some of the embodiments of the above AVES and method of operating the AVES, if the trip request exceeds a passenger capacity of any available autonomous vehicle in the fleet, the AVES COC implements simultaneous multi-vehicle routing to select and coordinate two or more autonomous vehicles to fulfill the trip request.

In some of the embodiments of the above AVES and method of operating the AVES, the AVES COC selects and unilaterally and automatically assigns the autonomous vehicle to fulfill the trip request.

In some of the embodiments of the above AVES and method of operating the AVES, the AVES COC generates a trip PIN corresponding to the unique trip ID for the trip request, and the AVES COC sends the unique trip ID and corresponding trip PIN to the AVES vehicle equipment of the selected autonomous vehicle and to the selected AVES application on the selected computing device of the hailing user.

In some of the embodiments of the above AVES and method of operating the AVES, the selected AVES application transmits a signal encoded with the unique trip ID via the selected computing device, the AVES vehicle equipment includes an antenna that scans for the AVES application's signal encoded with the unique trip ID, and the AVES vehicle equipment detects the AVES application's signal encoded with the unique trip ID and guides the autonomous vehicle toward the selected computing device, stops the autonomous vehicle, unlocks the doors of the autonomous vehicle and waits for the hailing user to enter the autonomous vehicle.

In some of the embodiments of the above AVES and method of operating the AVES, the AVES vehicle equipment includes a signal emitter that transmits a signal encoded with the unique trip ID, and the selected AVES application activates a camera on the selected computing device, senses the signal encoded with the unique trip ID and identifies on an image captured by the camera the selected autonomous vehicle transmitting the signal encoded with the unique trip ID.

In some of the embodiments of the above AVES and method of operating the AVES, the AVES COC stores a vehicle description for each autonomous vehicle in the fleet, and the AVES COC sends the vehicle description for the selected autonomous vehicle to the selected AVES application on the selected computing device of the hailing user.

In some of the embodiments of the above AVES and method of operating the AVES, the AVES vehicle equipment includes an AVES vehicle control system operably connected to a vehicle computer system of the autonomous vehicle, and the AVES vehicle control system transmits the trip information and/or trip route for the trip request to the vehicle computer system for guiding the autonomous vehicle to the pickup location at the pickup time.

In some of the embodiments of the above AVES and method of operating the AVES, the AVES vehicle equipment includes an AVES vehicle control system operably connected to a vehicle computer system of the autonomous vehicle, and the AVES vehicle control system transmits driving commands to the vehicle computer system of autonomous vehicle based on the trip information and/or trip route for guiding the autonomous vehicle to the pickup location at the pickup time.

In some of the embodiments of the above AVES and method of operating the AVES, the AVES vehicle equipment includes an interior video camera for sending images of the interior of the autonomous vehicle to the AVES COC so that a condition of the interior of the autonomous vehicle and/or a condition of the user inside the autonomous vehicle can be inspected.

In some of the embodiments of the above AVES and method of operating the AVES, the AVES vehicle equipment includes an Interactive Voice Response (IVR) system with a microphone and speaker and/or an interactive touchscreen for the user inside the autonomous vehicle and the AVES COC to communicate.

In some of the embodiments of the above AVES and method of operating the AVES, the IVR system and/or the interactive touchscreen identifies the unique trip ID and prompts the user for the trip PIN to authenticate the trip request.

In some of the embodiments of the above AVES and method of operating the AVES, at least one of the IVR system, the interactive touchscreen and the AVES application receives a modification request from the hailing user to alter the trip information and sends the modification request to alter the trip information to the AVES COC; the AVES COC determines whether the selected autonomous vehicle is capable of fulfilling the modification request and determines an altered trip route; if the selected autonomous vehicle is capable of fulfilling the modification request to alter the trip information, the AVES COC confirms that the user accepts the altered trip route via the IVR system, the interactive touchscreen or the AVES application and guides the selected autonomous vehicle according to the altered trip route; and if the selected autonomous vehicle is not capable of fulfilling the modification request to alter the trip information, the AVES COC selects an alternative autonomous vehicle for fulfilling the modification request to alter the trip information, confirms that the user accepts the alternative autonomous vehicle via the IVR system, the interactive touchscreen or the AVES application and implements multi-hop routing to coordinate the selected autonomous vehicle and the alternative autonomous vehicle to fulfill the trip request according to the altered trip route.

In some of the embodiments of the above AVES and method of operating the AVES, at least one of the IVR system, the interactive touchscreen and the AVES application receives a user emergency alert and sends the user emergency alert to the AVES COC; the AVES COC initiates an emergency protocol where the interior video camera and the IVR are activated so that AVES COC can assess the user emergency; and the AVES COC reroutes the autonomous vehicle to a hospital, police station or fire station, and/or calls for emergency response service.

In some of the embodiments of the above AVES and method of operating the AVES, the AVES vehicle equipment is operably connected to a computer system (e.g., CAN bus) of the autonomous vehicle to control unlocking/locking of doors of the autonomous vehicle and to detect whether the doors of the autonomous vehicle are open/closed.

BRIEF DESCRIPTION OF THE DRAWINGS

The foregoing summary, as well as the following detailed description, is better understood when read in conjunction with the appended drawings. For the purpose of illustrating the invention, exemplary embodiments are shown in the drawings, it being understood, however, that the present application is not limited to the specific embodiments disclosed. In the drawings.

DETAILED DESCRIPTION OF EMBODIMENTS OF THE INVENTION

Figure 1:
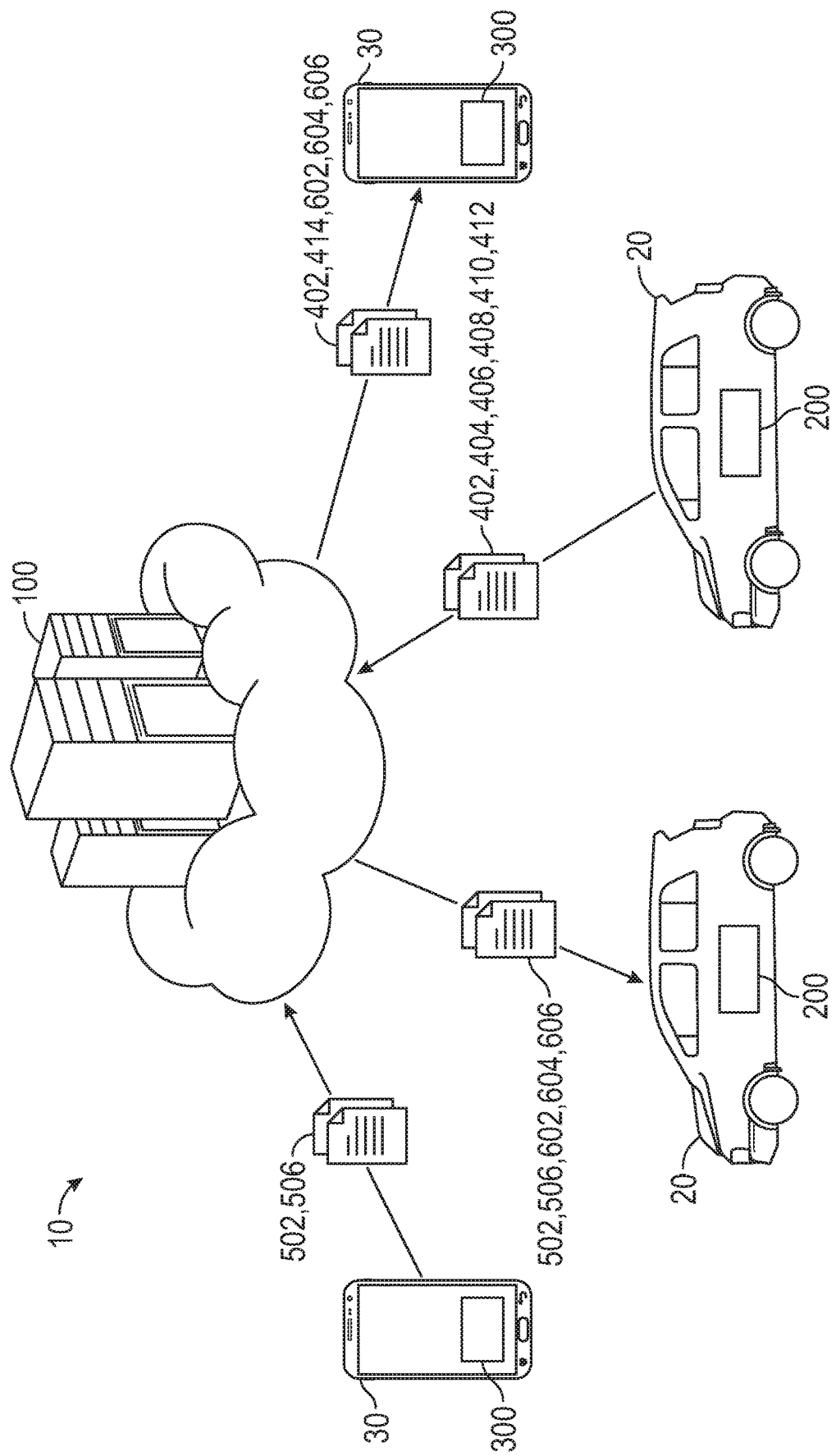
FIG. 1 shows a schematic diagram of an exemplary Autonomous Vehicle Enhancement System (AVES)

Before the various exemplary embodiments are described in further detail, it is to be understood that the present invention is not limited to the particular embodiments described. It is also to be understood that the terminology used herein is for the purpose of describing particular embodiments only, and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention is directed to Autonomous Vehicle Enhancement System (AVES) 10 for monitoring and controlling a fleet of autonomous vehicles 20 throughout a geographic area of a transportation network and providing transportation services to users in the transportation network. AVES 10 allows autonomous vehicles 20 in the transportation network to be remotely monitored and controlled so that the autonomous vehicles 20 can be efficiently managed to provide transportation services to users in the transportation network without the need for human operational involvement. In accordance with particular embodiments of the present invention, the fleet of autonomous vehicles 20 can comprise a commonly-owned fleet of vehicles, or may also include individually-owned vehicles that are part of the available fleet at the owner's discretion, much like current taxi services and fleets.

As shown in FIG. 1, AVES 10 comprises an AVES Central Operations Center (COC) 100, AVES vehicle equipment 200 installed on each autonomous vehicle 20 in the fleet and AVES applications 300 installed on computing devices 30 accessible by users.

AVES COC 100 communicates with AVES vehicle equipment 200 installed on each autonomous vehicle 20 to monitor and control autonomous vehicles 20 in the fleet. AVES COC 100 communicates with AVES vehicle equipment 200 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly. AVES COC 100 receives vehicle information from AVES vehicle equipment 200 installed on each autonomous vehicle, including a unique vehicle ID 402, real-time vehicle location 404 (e.g., GPS coordinates), real-time vehicle availability 406, real-time vehicle operational state 408, real-time vehicle condition 410 and real-time vehicle fuel/power-charge level 412. Real-time vehicle availability 406 may include information regarding whether the autonomous vehicle 20 has picked up a hailing user for an assigned trip request or has dropped of a hailing user after completion of an assigned trip request. Alternatively, an autonomous vehicle 20 may be "off duty" and therefore not available for trip requests until back on-line, for example, if a particular vehicle 20 is an individually-owned vehicle that is temporarily added to the fleet at the owner's discretion. Real-time vehicle operational state 408 may include information regarding the operational state of the mechanical and electrical systems of the autonomous vehicle 20. Real-time vehicle condition 410 may include information regarding state of cleanliness of the autonomous vehicle 20. Real-time vehicle fuel/power-charge level 412 may include information regarding at least one of a vehicle travel distance range, a percentage of fuel tank or electrical battery capacity available and units of available power or energy. AVES COC 100 uses the vehicle information received from AVES vehicle equipment 200 to monitor the fleet of autonomous vehicles 20 via the AVES vehicle equipment 200 installed on each autonomous vehicle 20 to determine the availability of autonomous vehicles 20 in the fleet and to assign available autonomous vehicles 20 in the fleet to an active pool of autonomous vehicles 20 that are ready for dispatch.

AVES COC 100 communicates with AVES applications 300 installed on computing devices 30 to receive service requests (e.g., trip requests) from users. AVES COC 100 communicates with AVES application 300 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly. AVES COC 100 receives trip requests from hailing users via AVES applications 300 installed on computing devices 30. AVES COC 100 receives from AVES applications 300 installed on computing devices 30 a unique user ID 502 associated with each user trip request 504 and trip information 506 associated with each user trip request 504. Trip information 506 may include pickup location, pickup date/time, destination location and intermediate stop location(s).

In response to a user trip request 504, AVES COC 100 selects an autonomous vehicle 20 from the active pool to respond to the trip request 504. For each user trip request 504, AVES COC 100 generates a unique trip ID 602 and corresponding unique trip PIN 604, and determines a trip route 606 based on trip information 506. Trip route 606 includes information about the expected mileage and duration of the trip. AVES COC 100 selects an autonomous vehicle 20 from the active pool that is optimally capable of fulfilling the trip request according to determined trip route 606. Once AVES COC 100 selects an autonomous vehicle 20 to fulfill trip request 504, AVES COC 100 sends vehicle assignment information to the hailing user via AVES application 300, including trip ID 602, trip PIN 604, trip route 606, and vehicle ID 402 and vehicle description 414 for the autonomous vehicle 20 assigned to fulfill trip request 504.

AVES COC 100 communicates with AVES vehicle equipment 200 installed on a selected autonomous vehicle 20 to guide said selected autonomous vehicle 20 to the hailing user. AVES COC 100 sends trip assignment information to AVES vehicle equipment 200 installed on the selected autonomous vehicle 20, including trip ID 602, trip PIN 604, trip route 606 and/or trip information 506, for the selected autonomous vehicle 20 to fulfill trip request 504. Also, AVES COC 100 communicates with AVES vehicle equipment 200 on autonomous vehicles 20 in the active pool, which are not assigned to respond to trip requests from hailing users, to guide autonomous vehicle 20 to standby locations throughout the transportation network's geographic area.

Figure 2:
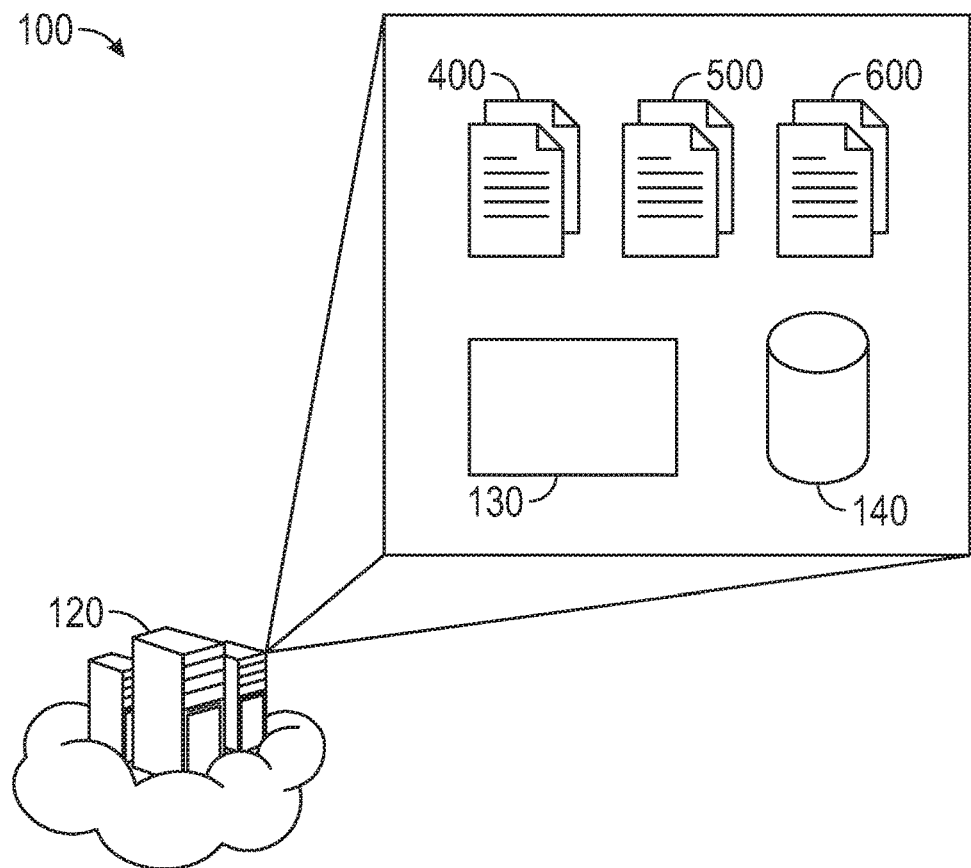
FIG. 2 shows a schematic diagram of an AVES Central Operations Center (COC) of the exemplary AVES of FIG. 1.

As shown in FIG. 2, AVES COC 100 includes one or more computer servers 120 in a centralized or distributed computing architecture. Computer server 120 includes an Artificial Intelligence (AI) system 130 and a knowledge base 140. Computer server 120 stores and maintains vehicle records 400 for each of the autonomous vehicles 20 registered in the transportation network, user records 500 for each of the users 30 registered in the transportation network and trip records 600 for each trip performed by the transportation network.

The functions of computer server 120 described herein may be implemented using computer applications comprising computer program code stored in a non-transitory computer-readable medium that is executed by a computer processor. The functions of computer server 120 described herein may also be implemented in programmable hardware devices such as field programmable gate arrays, programmable array logic, programmable logic devices or the like. Further, functions of computer server 120 described herein may be implemented using some combination of computer program(s) executed by a computer processor and programmable hardware devices. Thus, computer server 120 of the present application comprises suitable computer hardware and software for performing the desired functions and are not limited to any specific combination of hardware and software.

The executable computer program code may comprise one or more physical or logical blocks of computer instructions, which may be organized as an object, procedure, process or function. For example, the executable computer program code may be distributed over several different code partitions or segments, among different programs, and across several devices. Accordingly, the executable computer program need not be physically located together, but may comprise separate instructions stored in different locations which, when joined logically together, comprise the computer application and achieve the stated purpose for the computer application.

Figure 3:
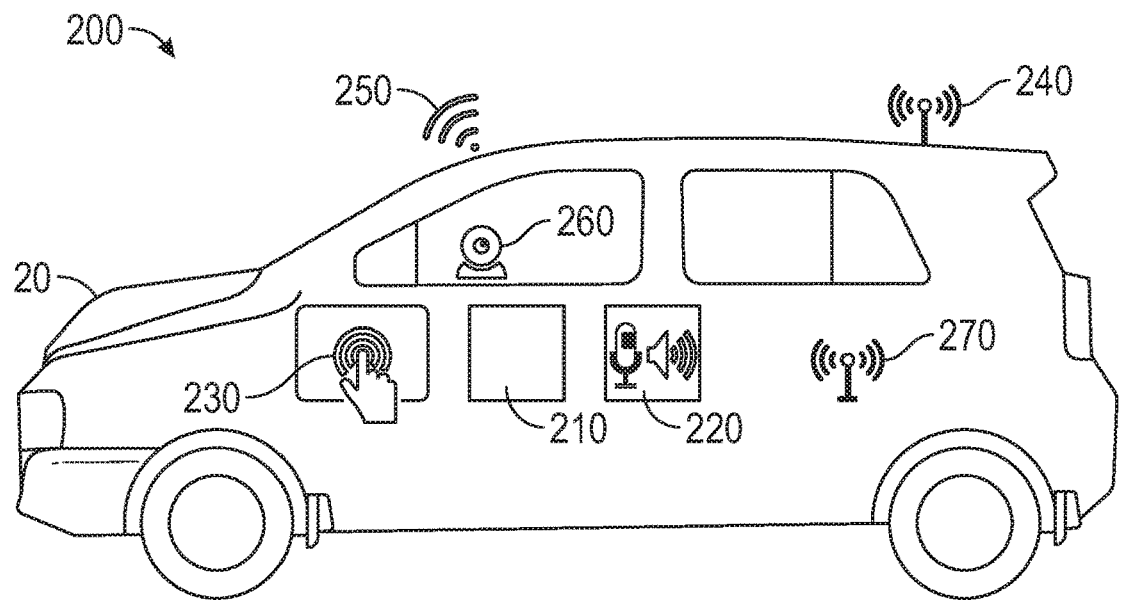
FIG. 3 shows a schematic diagram of AVES vehicle equipment of the exemplary AVES of FIG. 1.

As shown in FIG. 3, AVES vehicle equipment 200 installed on each autonomous vehicle 20 includes an AVES vehicle control system 210, Interactive Voice Response (IVR) System 220 including a microphone and speaker, interactive touchscreen 230, scanning antenna 240, signal emitter 250, one or more cameras 260 and one or more sensors 270. AVES vehicle control system 210 is configured to be operably connected to an autonomous driving system (e.g., CAN bus) of the autonomous vehicle 20 to retrieve vehicle data and to guide the autonomous vehicle 20 by providing trip information, route information, driving commands, etc. AVES vehicle control system 210 provides General Purpose Input/Output (GPIO) functions that can be controlled remotely by AVES COC 100 and that can be used to send vehicle status information to AVES COC 100. AVES vehicle control system 210 communicates with AVES COC 100 to send and receive the necessary data for guiding autonomous vehicle 20. AVES vehicle control system 210 communicates with AVES COC 100 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly.

The functions of AVES vehicle control system 210 described herein may be implemented using computer applications comprising computer program code stored in a non-transitory computer-readable medium that is executed by a computer processor. The functions of AVES vehicle control system 210 described herein may also be implemented in programmable hardware devices such as field programmable gate arrays, programmable array logic, programmable logic devices or the like. Further, functions of AVES vehicle control system 210 described herein may be implemented using some combination of computer program(s) executed by a computer processor and programmable hardware devices. Thus, AVES vehicle control system 210 of the present application comprises suitable computer hardware and software for performing the desired functions and are not limited to any specific combination of hardware and software.

AVES vehicle control system 210 on each autonomous vehicle 20 communicates with computer server 120 to send the necessary data for AVES COC 100 to monitor the fleet of autonomous vehicles 20. AVES vehicle control system 210 installed on each autonomous vehicle 20 sends computer server 120 vehicle information, including unique vehicle ID 402, real-time vehicle location 404 (e.g., GPS coordinates), real-time vehicle availability 406, real-time vehicle operational state 408, real-time vehicle condition 410 and real-time vehicle fuel/power-charge level 412. Real-time vehicle availability 406 may include information regarding whether the autonomous vehicle 20 has picked up a hailing user for an assigned trip request or has dropped off a hailing user after completion of an assigned trip request. Real-time vehicle availability 406 may be established using at least one of user input to IVR System 220, user input to interactive touchscreen 230, images from cameras 260 and signals from sensors 270 to determine whether a user has entered or exited autonomous vehicle 20. Real-time vehicle operational state 408 may include information regarding the operational state of the mechanical and electrical systems of the autonomous vehicle. Real-time vehicle operational state 408 may be established using the connection of AVES vehicle control system 210 to the autonomous driving system (e.g., CAN bus) of the autonomous vehicle 20. Real-time vehicle condition 410 may include information regarding state of cleanliness of the autonomous vehicle 20. Real-time vehicle condition 410 may be established using at least one of user input to IVR System 220, user input to interactive touchscreen 230, images from cameras 260 and signals from sensors 270 to determine whether the autonomous vehicle 20 is soiled, littered, or in disrepair. Real-time vehicle fuel/power-charge level 412 may include information regarding at least one of a vehicle travel distance range, a percentage of fuel tank or electrical battery capacity available and units of available power or energy. Real-time vehicle fuel/power-charge level 412 may be established using the connection of AVES vehicle control system 210 to the autonomous driving system (e.g., CAN bus) of the autonomous vehicle 20.

Also, AVES vehicle control system 210 installed on selected autonomous vehicle 20 communicates with computer server 120 to receive the necessary data for guiding selected autonomous vehicle 20 to the hailing user. AVES vehicle control system 210 installed on selected autonomous vehicle 20 receives trip assignment information from computer server 120, including trip ID 602, trip PIN 604, trip route 606 and/or trip information 506, for the selected autonomous vehicle 20 to fulfill trip request 504. Further, AVES vehicle control system 210 installed on autonomous vehicles 20 in the active pool, which are not assigned to respond to trip requests from hailing users, communicate with computer server 120 to receive the necessary data for guiding autonomous vehicle 20 to standby locations throughout the transportation network's geographic area.

A user may access the transportation network services via an AVES application 300 installed on a computing device 30 that is in communication with AVES COC 100. AVES application 300 communicates with AVES COC 100 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly. AVES application 300 is embodied in a set of computer executable instructions stored in a non-transitory computer-readable medium, which are executed by a processor of the computing device 30 to provide the user access to AVES COC 100 to request transportation network services. Computing device 30 may be any suitable device (e.g., PC, laptop, tablet, smartphone, etc.) for executing AVES application 300 to perform the functions described hereafter, and is preferably, a mobile computing device (e.g., tablet, smartphone, etc.). Alternatively, a trip may be requested via other methods, such as via telephone or Application Programming Interface (API), or even in person at a kiosk with an API. For instance, AVES COC may be configured to dynamically select and assign autonomous vehicle(s) 20 to fulfill trip request(s) 504 generated by an API or other system that has been previously registered and approved to authorize such trip request(s) 504.

AVES application 300 installed on computing device 30 communicates with computer server 120 to send trip request 504 and receive vehicle assignment information for trip request 504. AVES application 300 installed on a computing device 30 sends computer server 120 a unique user ID 502 associated with user trip request 504 and trip information 506 associated with user trip request 504. Trip information 506 may include pickup location, pickup date/time, destination location and intermediate stop location(s). Once computer server 120 selects an autonomous vehicle 20 to fulfill trip request 504, AVES application 300 installed on computing device 30 receives vehicle assignment information from computer server 120, including trip ID 602, trip PIN 604, trip route 606, and vehicle ID 402 and vehicle description 414 for the autonomous vehicle 20 assigned to fulfill trip request 504.

Computer server 120 of AVES COC 100 maintains the necessary data monitoring and managing a fleet of autonomous vehicles 20 in the transportation network and dispatching autonomous vehicles 20 to users of the transportation network. Computer server 120 stores and maintains vehicle records 400 for each of the autonomous vehicles 20 registered in the transportation network, user records 500 for each of the users 30 registered in the transportation network and trip records 600 for each trip performed by the transportation network.

Each autonomous vehicle 20 has a corresponding vehicle record 400 maintained in computer server 120, which may include a unique vehicle ID 402, real-time vehicle location 404 (e.g., GPS coordinates), real-time vehicle availability 406, real-time vehicle operational state 408, real-time vehicle condition 410, real-time vehicle fuel/power-charge level 412, vehicle description 414, vehicle owner specified restriction(s) 416 and vehicle billing or payment account 418. Real-time vehicle availability 406 may include information regarding whether the autonomous vehicle 20 is in the active pool, has been assigned to respond a trip request from a hailing user, is waiting or en route to pickup a hailing user for an assigned trip request, has picked up a hailing user for an assigned trip request or has dropped of a hailing user after completion of an assigned trip request. Real-time vehicle operational state 408 may include information regarding the operational state of the mechanical and electrical systems of the autonomous vehicle 20. Real-time vehicle condition 410 may include information regarding state of cleanliness of the autonomous vehicle 20. Real-time vehicle fuel/power-charge level 412 may include information regarding at least one of a vehicle travel distance range, a percentage of fuel tank or electrical battery capacity available and units of available power or energy. Vehicle description 414 may include a general vehicle description (e.g., type, make, model, year, etc.), vehicle photograph, passenger capacity, vehicle travel range, state DMV vehicle registration information, insurance information, and repair and maintenance history. At the time of registration (which may be updated as necessary), vehicle owner/operator may specify restriction(s) 416, which may include an allowable operational trip area that the autonomous vehicle 20 may travel (e.g., defined by a radius around a latitude/longitude reference point, or City, County, State or other geographic boundaries), allowable days and times when the autonomous vehicle 20 may be assigned to a trip, and minimum revenue rate for a trip to which the autonomous vehicle may be assigned.

Each user has a corresponding user record 500 maintained in computer server 120, which may include a unique user ID 502, trip request(s) 504 associated with user ID 502, trip information 506 corresponding to each trip request 504, user preference(s) 508, real-time user location 510 and user billing or payment account 512. Trip information 506 may include pickup location, pickup date/time, destination location and intermediate stop location(s). User preference(s) 508 may include pricing, priority, speed of trip, vehicle capacity, cabin temperature, etc. User preference(s) 508 may be provided at the time of user registration with the transportation network or at the time of making a specific trip request. Real-time user location 510 may be established using the GPS function of the computing device on which AVES application 300 is installed.

Each trip request 504 has a corresponding trip record 600 maintained in computer server 120, which may include unique user ID 502 associated with user trip request 504, trip information 506 associated with trip request 504, vehicle ID 402 assigned to trip request 504, trip ID 602 and trip PIN 604 associated with trip request 504, trip route 606 determined for trip request 504, trip modification 608 requested by user for trip request 504 and altered trip route 610 provided for trip request 504.

Figure 5A:
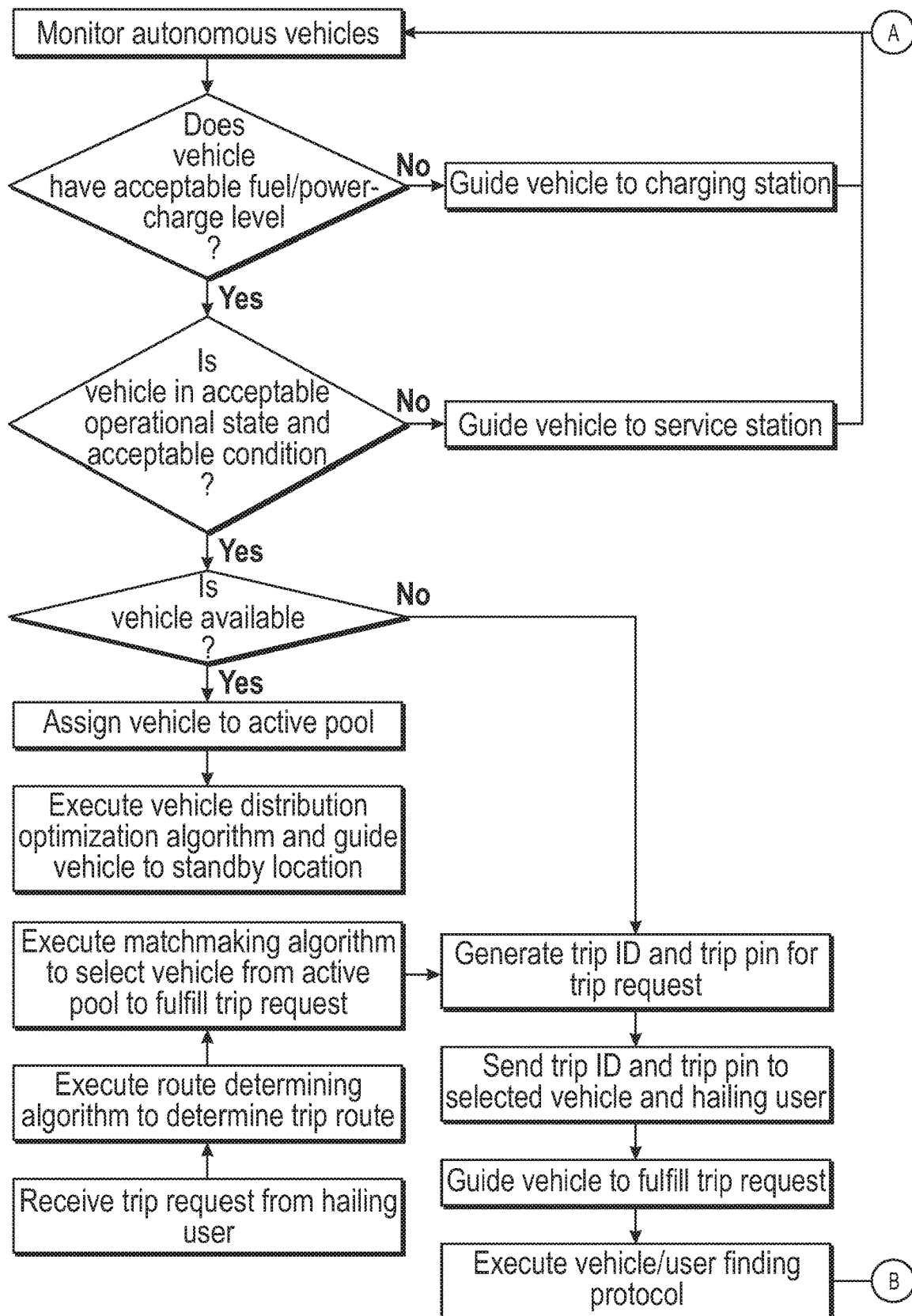
FIGS. 5A and 5B show an exemplary flow diagram for the operation of the exemplary AVES of FIG. 1.
Figure 5B:
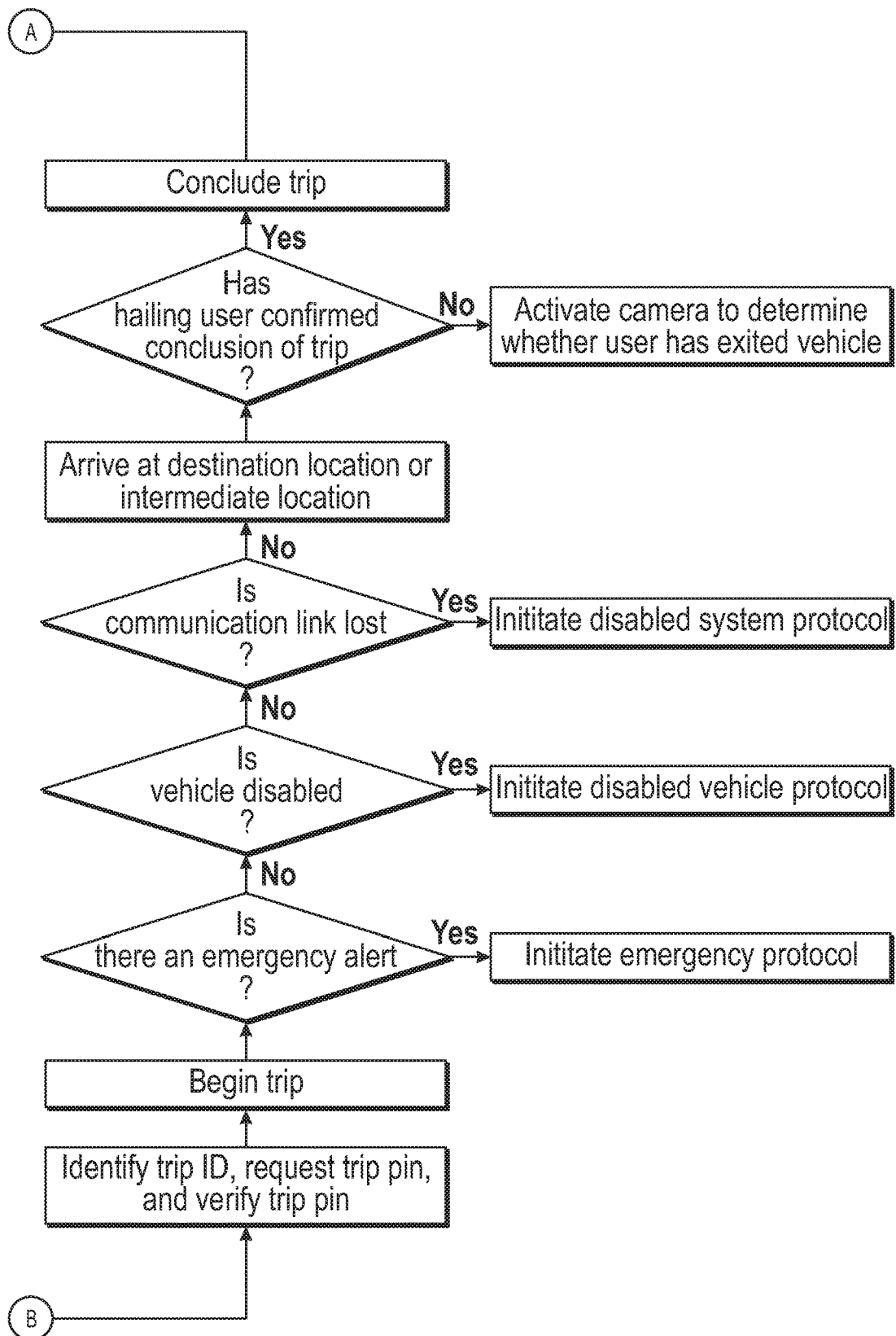

As shown in FIGS. 5A and 5B, in operation, computer server 120 monitors the fleet of autonomous vehicles 20 via AVES vehicle control system 210 installed on each autonomous vehicle 20 to determine real-time vehicle location 404, real-time vehicle availability 406, real-time vehicle operational state 408, real-time vehicle condition 410 and real-time vehicle fuel/power-charge level 412 of each autonomous vehicle 20 in the fleet. For example, computer server 120 may intermittently query AVES vehicle control system 210 installed on each autonomous vehicle 20 in the fleet at a specified frequency (e.g., every minute). Based on the vehicle information queried from the AVES vehicle control systems 210 of autonomous vehicles 20 in the fleet, computer server 120 dynamically assigns autonomous vehicles 20 to an active pool if the autonomous vehicles 20 are available, are in acceptable operational state (e.g., no fault indication), are in acceptable condition (e.g., no alert or detection of a dangerous or unsanitary condition) and have acceptable fuel/power-charge level (e.g., higher than predefined minimum level). Real-time vehicle operational state 408 may include information regarding the operational state of the mechanical and electrical systems of the autonomous vehicle 20 (e.g., low tire pressure, loss of heating or air conditioning, mechanical problem, etc.). Real-time vehicle operational state 408 may be established using the connection of AVES vehicle control system 210 to the autonomous driving system (e.g., CAN bus) of the autonomous vehicle 20. Real-time vehicle condition 410 may include information regarding state of cleanliness of the autonomous vehicle 20. Real-time vehicle condition 410 may be established using at least one of user input to IVR System 220, user input to interactive touchscreen 230, images from cameras 260 and signals from sensors 270 to determine whether the autonomous vehicle 20 is soiled, littered, or in disrepair. Computer server 120 guides autonomous vehicles 20 in the fleet, which are not in acceptable operational state or condition, to service locations for maintenance service.

Computer server 120 guides autonomous vehicles 20 in the fleet, which do not have acceptable fuel/power-charge level, to fueling/power-charging stations for fueling/power-charging. Electric autonomous vehicles 20 may be guided to power-charging stations and charged using systems and methods as described in U.S. patent application Ser. No. 15/956,998, U.S. patent application Ser. No. 15/957,022, U.S. patent application Ser. No. 15/957,041, and U.S. patent application Ser. No. 15/957,057, which are hereby incorporated by reference in their entireties.

Computer server 120 receives a trip request 504 from a hailing user via a selected AVES application 300 on a selected computing device 30, the trip request 504 including a unique user ID 502 associated with the hailing user and trip information 506 including pickup location, pickup date/time, destination location, and any intermediate stop location(s). Computing device 30 may be any suitable device (e.g., PC, laptop, tablet, smartphone, etc.) for executing AVES application 300 to perform the functions described hereafter, and is preferably, a mobile computing device (e.g., tablet, smartphone, etc.). Alternatively, a trip may be requested via other methods, such as telephone or Application Programming Interface (API), as discussed above. For instance, AVES COC may be configured to dynamically select and assign autonomous vehicle(s) 20 to fulfill trip request(s) 504 generated by an API or other system that has been previously registered and approved to authorize such trip request(s) 504. For example, in the event of an unexpected school closing due to an adverse situation, an API may receive a broadcast notification from the school's alert system and automatically generate trip request(s) 504. Parents would no longer have to unexpectedly leave work for such events to pick up their children. At the time of registration for this service, a parent would receive a unique emergency ride identifier, which may be displayed by a selected autonomous vehicle 20 assigned to fulfill the trip request 504 so that the child would know which autonomous vehicle 20 is assigned to the child.

Computer server 120 determines a trip route 606 based on the trip information 506 for the trip request 504. For example, Artificial Intelligence System 130 executes a Route Determining Algorithm to determine the trip route 606 (including estimated trip duration) for fulfilling the trip request 504 based on the trip information 506 and information in knowledge base 140. Knowledge base 140 includes historical traffic conditions 700, real-time traffic conditions 702, scheduled road closures 704, scheduled events 706 and scheduled construction 708. Route Determining Algorithm uses trip information 506 (e.g., pickup location, pickup date/time, destination location and any intermediate stop location) and information from knowledge base 140 (e.g., the historical traffic conditions 700, real-time traffic conditions 702, scheduled road closures 704, scheduled events 706 and scheduled construction 708) to determine the trip route that is optimally suited for fulfilling the trip request 504. Historical data can identify popular pick-up and drop-off locations based upon analysis of existing trip requests. The AVES COC can also recognize "popular" pick-up and drop-off locations based on an ongoing record of trip requests, and coordinated based on patterns related to the time of day (e.g., morning and evening rush-hour; the day (e.g., weekday or weekend); time of year (e.g., summer versus winter); or varying time durations (e.g., daily patterns, weekly patterns, or longer time frames).

Computer server 120 selects an autonomous vehicle 20 to fulfill the trip request 504. For example, Artificial Intelligence System 130 executes a Matchmaking Algorithm to select the autonomous vehicle 20 to fulfill the trip request 504 based on the determined trip route 606 and information in knowledge base 140. Knowledge base 140 includes user preference(s) 508, and for each autonomous vehicle 20 in the fleet, real-time vehicle location data 404, real-time vehicle availability data 406, real-time vehicle operational state 408, real-time vehicle condition data 410, real-time vehicle fuel/power-charge level indication 412, vehicle description 414, vehicle owner specified restriction(s) 416, historical traffic conditions 700, real-time traffic conditions 702, scheduled road closures 704, scheduled events 706 and scheduled construction 708. Matchmaking Algorithm uses the determined trip route 606 and information from knowledge base 140 (e.g., user preference(s) 508, real-time vehicle location data 404, real-time vehicle availability data 406, real-time vehicle operational state 408, real-time vehicle condition data 410, real-time vehicle fuel/power-charge level indication 412, vehicle description 414, vehicle owner specified restriction(s) 416, historical traffic conditions 700, real-time traffic conditions 702, scheduled road closures 704, scheduled events 706 and scheduled construction 708) to select the autonomous vehicle from the active pool that is optimally suited to travel the determined route 606 to fulfill the trip request 504.

If the trip request 504 exceeds an operational range of any available autonomous vehicle 20 in active pool, computer server 120 selects two or more autonomous vehicles 20 to sequentially fulfill the trip request 504. For example, Artificial Intelligence System 130 executes the Matchmaking Algorithm to implement multi-hop routing to select two or more autonomous vehicles that are optimally suited to travel the determined route in sequential segments to fulfill the trip request. The multi-hop routing executed by Artificial Intelligence System 130 is similar to how airlines sometimes utilize multi-segment trips for travelling long distances. Computer server 120 automatically offers a multi-segment trip route 606 to the user in response to trip request 504. Artificial Intelligence System 130 may implement multi-hop routing to provide a convenient location and staggered drop-off and pickup times for the vehicle change to allow for a rest stop (e.g., restroom stop, food stop, etc.) and to avoid unnecessary waiting charges. Computer server 120 coordinates the vehicle change by guiding the two or more selected autonomous vehicles 20 to a vehicle change location at a specified drop-off time and pickup time.

If the trip request 504 exceeds a passenger capacity or load capacity of any available autonomous vehicle 20 in the active pool, computer server 120 selects two or more autonomous vehicles 20 to simultaneously fulfill the trip request 504. For example, Artificial Intelligence System 130 executes the Matchmaking Algorithm to implement multi-vehicle routing to select two or more autonomous vehicles that are optimally suited to simultaneously travel the determined trip route 606 to fulfill the trip request. Computer server 120 automatically offers two or more autonomous vehicles 20 to the user in response to trip request 504. Multi-vehicle routing is implemented by automatically coordinating the driving patterns of the two or more autonomous vehicles 20 to stay in an ad-hoc caravan formation. By maintaining an ad-hoc caravan formation, passengers (e.g., members of a large family, etc.) can be kept relatively close together. To this end, the selected autonomous vehicles 20 can be in communication with each other, as well as with AVES COC 100, during the trip, so that if one vehicle deviates from the trip route 606 (e.g., breaks down or gets stuck in traffic), the other vehicle will be aware of such deviation and can make accommodations as deemed necessary with assistance form AVES COC 100.

Computer server 120 selects autonomous vehicle(s) 20 to fulfill the trip request 504 and unilaterally and automatically assigns the selected autonomous vehicle(s) 20 to fulfill the trip request 504. This approach differs from conventional approaches implemented by existing "ride-sharing" companies or transportation network companies. Typically, a transportation network company offers a trip opportunity to vehicles located near the hailing user and then the transportation network company waits for acceptance of the trip opportunity by a vehicle. By contrast, AVES COC 100 of the present application unilaterally, unequivocally and automatically assigns the selected autonomous vehicle(s) 20 that is optimally suited to fulfill the trip request 504 without rejection, uncertainty or delay. This approach ensures that AVES COC 100 is able to assign the most suitable autonomous vehicle 20 for a trip request 504, and not just offer the trip request 504 to autonomous vehicle(s) 20 merely located near the hailing party but which may be insufficient for successful and efficient completion of the trip request for other reasons. By removing the human factor, AVES 10 is able to operate quickly, efficiently and cost effectively. Other than the hailing user that initiates a trip request 504, there is no human intervention in the "instant" and automatic selection and assignment process, which allows for dispatch of autonomous vehicles 20 to hailing users without delay. Additionally, with familiarity with AVES 10, a user can be confident that AVES 10 will deliver an autonomous vehicle 20 that is capable of fulfilling a trip request 504.

If, before the completion of a scheduled pickup date/time for a trip request 504, the Matchmaking Algorithm determines that a newly available autonomous vehicle 20 in the active pool is better suited for fulfilling the trip request 504 than the previously selected autonomous vehicle 504, the Artificial Intelligence System 130 unilaterally and automatically selects and substitutes the newly available autonomous vehicle 20 to fulfill the trip request in lieu of the previously selected vehicle 20. This reassignment process is automatic and invisible to the hailing user, who may only see the end-result of the reassignment of autonomous vehicles 20 as a reduced wait time for an autonomous vehicle 20. AVES COC 100 suspends the reassignment process at a specified period of time before the scheduled pickup time for a trip request 504 and before vehicle description 414 of the selected autonomous vehicle 20 is sent to AVES application 300. Unlike a transportation network that uses human drivers, AVES 10 can improve yield management and operational efficiency because AVES COC 100 can automatically and unilaterally assign and reassign autonomous vehicles 20 to fulfill trip requests 504 without negatively affecting a working relationship between a transportation network company and its drivers. For example, when a driver accepts a trip request through a transportation network company, the driver proceeds toward a requested location with the expectation of revenue from the accepted trip request, but if a transportation network company were to unexpectedly reassign that trip request to another driver, it would have a negative effect working relationship between the transportation network company and the displaced driver.

For each trip request 504 received by AVES COC 100, computer server 120 generates a unique trip ID 602 and corresponding unique trip PIN 604 corresponding to the trip request 504. Further, computer server 120 associates trip request 504 and corresponding trip information 506, user ID 502 for the hailing user, vehicle ID 402 for the selected autonomous vehicle 20, trip ID 602 and corresponding trip PIN 604 for the trip request 504 and determined trip route 606 for the trip request 504 in a trip record 600 that is stored in computer server 120. Once AVES COC 100 selects an autonomous vehicle 20 to fulfill trip request 504, AVES COC 100 communicates with AVES vehicle equipment 200 installed on selected autonomous vehicle 20 to guide selected autonomous vehicle 20 to the to the pickup location at the pickup time. Computer server 120 sends trip assignment information to AVES vehicle control system 210 installed on selected autonomous vehicle 20, including trip ID 602, trip PIN 604, trip route 606 and/or trip information 506, for the selected autonomous vehicle 20 to fulfill trip request 504. AVES vehicle control system 210 transmits the trip information 506 and/or trip route 606 for the trip request 504 to the vehicle computer system (e.g., CAN bus) for guiding the autonomous vehicle 20 to the pickup location at the pickup time. Alternatively, AVES vehicle control system 210 transmits driving commands to the vehicle computer system (e.g., CAN bus) of autonomous vehicle 20 based on the trip information 506 and/or trip route 606 for guiding the autonomous vehicle 20 to the pickup location at the pickup time. If a trip request 504 is reassigned to a newly selected autonomous vehicle 20, computer server 120 sends trip assignment information to the AVES vehicle control system 210 of the newly selected autonomous vehicle 20 to guide the newly selected autonomous vehicle 20 to the to the pickup location at the pickup time. Also, computer server 120 diverts the previously selected autonomous vehicle to another pickup location or a standby location. Further, computer server 120 updates trip record 600 to replace the previously selected autonomous vehicle with the newly selected autonomous.

Computer server 120 guides autonomous vehicles 20 in the active pool, which are not assigned to respond to trip requests from hailing users, to standby locations throughout the transportation network's geographic area. For example, Artificial Intelligence System 130, which includes knowledge base 140, executes a Vehicle Distribution Optimization Algorithm to determine standby locations for the autonomous vehicles 20 in the fleet. Knowledge base 140 includes real-time vehicle location data 404 for the autonomous vehicles 20 in the active pool, historical information regarding previous trip requests 504, real-time information regarding current trip requests 504 and information regarding scheduled events in the transportation network's geographic area. Vehicle Distribution Optimization Algorithm uses current information (e.g., current time of day, date, day of week and weather) and information from knowledge base 140 (e.g., real-time vehicle location data 404 for the autonomous vehicles 20 in the active pool, historical information regarding previous trip requests 504, real-time information regarding current trip requests 504 and information regarding scheduled events in the transportation network's geographic area) to select standby locations for autonomous vehicles 20 throughout the transportation network's geographic area to achieve a vehicle distribution that is optimally suited for fulfilling expected demand for trip requests. Standby locations may include fueling/power-charging stations, street parking spaces, parking garages, airports and bus stations, schools, and taxi queues. The real-time information regarding trip requests 504 and information regarding scheduled events in the transportation network's geographic area are received by the AVES COC from public messaging systems, the AVES applications installed on computing devices accessible by the users or the AVES vehicle equipment installed on the autonomous vehicles 20 in the fleet.

AVES COC 100 may direct autonomous vehicles 20 in the active pool, which are not assigned to respond to trip requests from hailing users, to taxi queues at locations that traditionally depend on the timeliness and efficiency of taxi queues (e.g., airports, public events, hotels, etc.). In response to a trip request 504 made via AVES application 300 as described above, computer server 120 provides a trip ID 602 for the trip request 504 and offers the user the ability to go to a taxi queue and pick the first available autonomous vehicle 20 if appropriate for the trip request 504. Once the hailing party enters an autonomous vehicle 20 in the taxi queue, the user provides the trip ID 602 via IVR System 220 or interactive touchscreen 230. AVES vehicle control system 210 transmits the trip ID 602 entered by the user to AVES COC 100, and computer server 120 sends trip assignment information to AVES vehicle control system 210 of the selected autonomous vehicle 20, including trip ID 602, trip route 606 and/or trip information 506, for the selected autonomous vehicle 20 to fulfill trip request 504. AVES COC 100 monitors the number of trip requests 504 fulfilled by autonomous vehicles in taxi queues, and directs additional autonomous vehicles as necessary to match demand.

AVES COC 100 may direct autonomous vehicles 20 in the active pool, which are not assigned to respond to trip requests from hailing users, fueling/power-charging stations for fueling/power-charging while waiting for assignment to a trip request 504 in order to maintain fuel/power charge levels of the autonomous vehicles 20 in the active pool as full as possible and optimize the utilization rate of the autonomous vehicles in the active pool. Electric autonomous vehicles 20 may be guided to power-charging stations and charged using systems and methods as described in U.S. patent application Ser. No. 15/956,998, U.S. patent application Ser. No. 15/957,022, U.S. patent application Ser. No. 15/957,041, and U.S. patent application Ser. No. 15/957,057, which are hereby incorporated by reference in their entireties.

AVES COC 100 removes autonomous vehicles 20, which are not in acceptable vehicle operational state 408 or vehicle condition 410, from the active pool and guides those autonomous vehicles 20 to service locations for maintenance service. Real-time vehicle operational state 408 may include information regarding the operational state of the mechanical and electrical systems of the autonomous vehicle 20 (e.g., low tire pressure, loss of heating or air conditioning, mechanical problem, etc.). Real-time vehicle operational state 408 may be established using the connection of AVES vehicle control system 210 to the autonomous driving system (e.g., CAN bus) of the autonomous vehicle 20. Real-time vehicle condition 410 may include information regarding state of cleanliness of the autonomous vehicle 20. Real-time vehicle condition 410 may be established using at least one of user input to IVR System 220, user input to interactive touchscreen 230, images from cameras 260 and signals from sensors 270 to determine whether the autonomous vehicle 20 is soiled, littered, or in disrepair. After a trip is complete, cameras 260 may without intervention detect anomalies such as, a passenger still in the car, extra items in the autonomous vehicle 20 since the start of the trip, stains, discarded food or drink containers or anything else that detracts from a clean environment in the autonomous vehicle 20. In the case of a forgotten valuable item, AVES COC directs the autonomous vehicle 20 to a service location for item retrieval and notifies the prior passenger of the forgotten item. Also, AVES COC 100 periodically (e.g., once a day) removes an autonomous vehicle 20 from the active pool and guides the autonomous vehicle to a service location for inspection, cleaning, maintenance and/or service. In the event that an autonomous vehicle 20 picks up a user for a trip request 504 in an unacceptable condition, the user may indicate the unacceptable condition and reject the autonomous vehicle 20 via the autonomous vehicle's IVR System 220 and/or interactive touchscreen 230. Upon receiving an indication of an unacceptable vehicle condition from AVES vehicle control system 210 of the autonomous vehicle 20, AVES COC automatically assigns a replacement autonomous vehicle 20 at highest priority, and takes the autonomous vehicle 20 in unacceptable condition out of the active pool and directs said autonomous vehicle 20 to a service location.

AVES COC 100 sends vehicle assignment information to the hailing user via AVES application 300, including unique trip ID 602, trip PIN 604, trip route 606, and vehicle ID 402 and vehicle description 414 for the autonomous vehicle 20 assigned to fulfill trip request 504. Also, AVES COC 100 sends the hailing user via AVES application 300 real-time vehicle location progress updates, including estimated time until arrival.

Once the assigned autonomous vehicle 20 and user's device 30 with AVES application 300 are within a specified distance, AVES 10 initiates a vehicle/user finding protocol. During the vehicle/user finding protocol, AVES application 300 transmits a signal 302 encoded with the unique trip ID 602 via the selected computing device 30 and AVES vehicle control system 210 activates antenna 240 to scan for the AVES application's signal 302 encoded with the unique trip ID 602. For example, during the vehicle/user finding protocol, AVES application 300 automatically activates a BLUETOOTH® transmitter in the computing device 30 to transmit signal 302 encoded with the unique trip ID 602. A 2.4 GHz frequency band for BLUETOOTH® transmission and reception is disclosed, but any other suitable communication protocol may be used. Antenna 240 may be a phased array antenna that is electronically steerable to scan 360° for the signal transmission encoded with the trip ID 602 (e.g., Bluetooth) from the selected computing device of the hailing user. Alternatively, antenna 240 may be a conventional directional antenna that is motorized to scan 360° for the signal transmission encoded with the trip ID 602 (e.g., Bluetooth) from the selected computing device of the hailing user. Also, during the vehicle/user finding protocol, AVES vehicle control system 210 activates signal emitter 250 to transmit a signal 252 encoded with the unique trip ID 602 and AVES application 300 activates a video camera on computing device 30 to sense the signal emitter's signal 252 encoded with the unique trip ID 602. For example, signal emitter 250 may be an omni-directional infrared emitter that transmits a continuously modulated signal 252 encoded with the unique trip ID 602. AVES application 300 activates a video camera on computing device 30 to sense the uniquely modulated infrared signal emitted by signal emitter 250.

Figure 4:
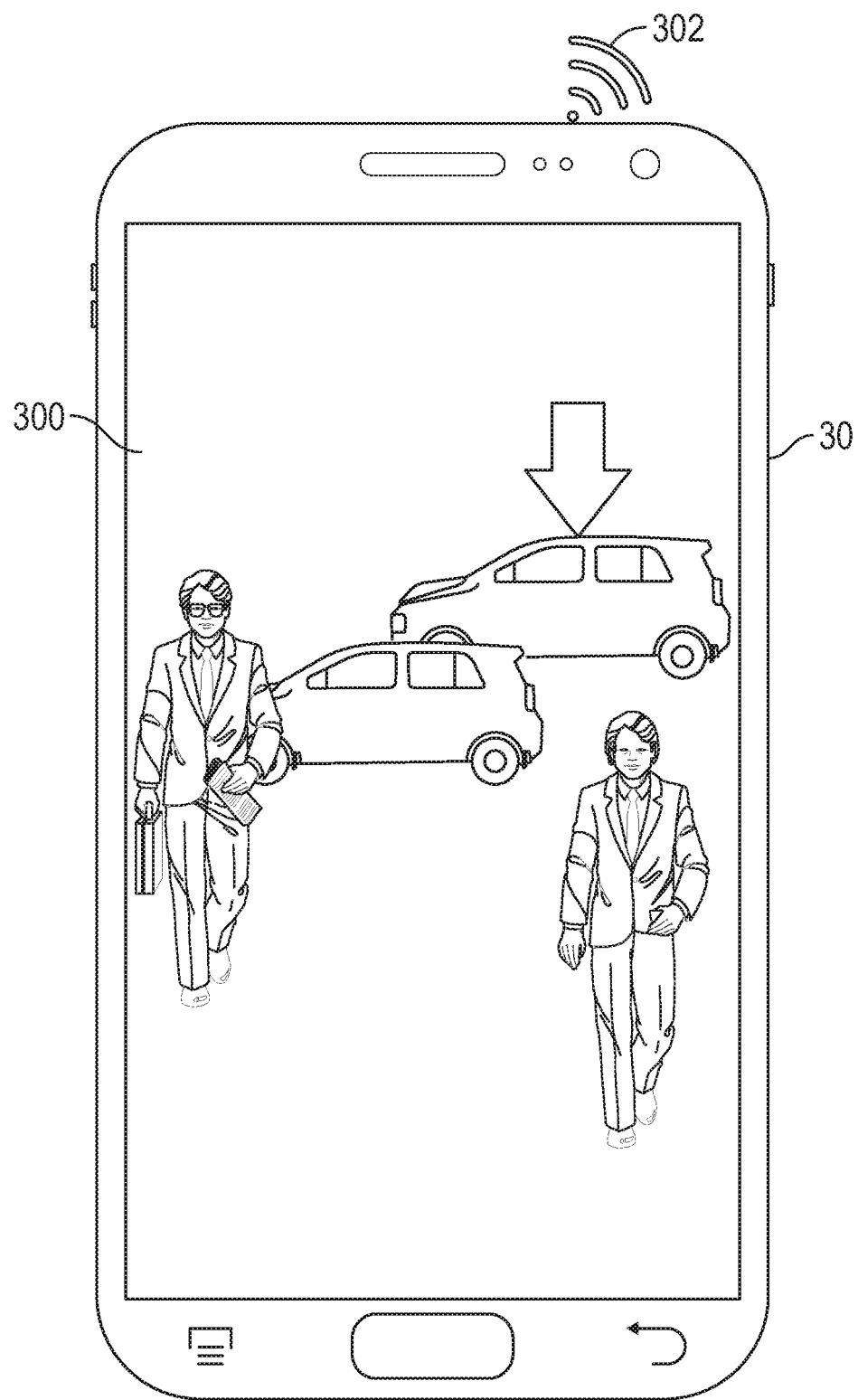
FIG. 4 shows a schematic diagram of AVES application of the exemplary AVES of FIG. 1.

AVES vehicle control system 210 uses the signal transmission encoded with the unique trip ID 602 that is detected by antenna 240 to guide the autonomous vehicle 20 toward the hailing user. AVES vehicle control system 210 determines the location of the selected computing device transmitting the signal 302 encoded with the unique trip ID 602 based on the direction of greatest received signal strength, which is indicative of the direction the autonomous vehicle 20 should move toward in order to intercept the selected computing device transmitting the signal 302 encoded with the trip ID 602. Additionally, as shown in FIG. 4, as the user uses the camera of the computing device 30 to scan an area for the selected autonomous vehicle 20 assigned to the trip request 504, the uniquely modulated infrared signal emitted by signal emitter 250 of the autonomous vehicle 20 causes an "augmented reality" image (e.g., a flashing arrow pointing toward the autonomous vehicle 20) to be superimposed on the screen over the image captured by the camera. Thus, the hailing user can quickly and easily identify the selected autonomous vehicle 20 assigned to the trip request 504 from amongst a plethora of vehicles in an area. Optionally, AVES application 300 may provide audible feedback and/or haptic feedback through the computing device 30 to guide a visually-impaired user toward the selected autonomous vehicle 20 transmitting the signal 252 encoded with the trip ID 602. For example, AVES application 300 may provide audible directional guidance (e.g., "left/straight/right") and caution guidance (e.g. "Caution! Traffic approaching from your left").

Once autonomous vehicle 20 is within a specified distance to the hailing user, which may be determined based on the strength of the signal received from the user's computing device or other data, along with an analysis of local conditions, AVES vehicle control system 210 determines that it has made a terminal intercept of the user and stops the autonomous vehicle 20. After AVES vehicle control system 210 stops autonomous vehicle 20, AVES vehicle control system 210 activates the hazard flashers, unlocks the doors and trunk and waits for the hailing user to enter the autonomous vehicle 20. The interconnection between AVES vehicle control system 210 and the computer system (e.g., CAN bus) of the autonomous vehicle 20, allows AVES vehicle control system 210 to activate the hazard flashers, unlock the doors and trunk and detect when the hailing user has entered the autonomous vehicle 20 (e.g., detect when a vehicle door has opened and closed). Also, AVES vehicle control system 210 may determine whether items have been placed in the trunk by detecting whether the trunk has been opened and closed. Additionally, AVES vehicle equipment 200 may include camera(s) 260 and/or sensor(s) 270 in the trunk space of the autonomous vehicle, which are connected to AVES vehicle control system 210, for determining whether items have been left behind in the trunk.

Once AVES vehicle control system 210 detects that a passenger has entered the autonomous vehicle 20, AVES vehicle control system 210 activates IVR System 220 to announce a welcome message and the unique trip ID 602 for the trip request 504. Also, AVES vehicle control system 210 activates interactive touchscreen 230 to display the unique trip ID 602 for the trip request 504. Further, AVES vehicle control system 210 activates IVR System 220 and interactive touchscreen 230 to prompt the user for the trip PIN 604 corresponding to the unique trip ID 602. Once AVES vehicle control system 210 receives trip PIN 604 from the user, AVES vehicle control system 210 compares trip PIN 604 received from the user to trip PIN 604 corresponding to unique trip ID 602. If trip PIN 604 received from the user matches trip PIN 604 corresponding to unique trip ID 602, the user is verified. Additionally, AVES vehicle control system 210 activates IVR System 220 and interactive touchscreen 230 to prompt the user to confirm the destination. The verification process helps ensure that users do not get into the wrong autonomous vehicle 20 and end up at the wrong destination. AVES vehicle control system 210 will also check to make sure that any occupied seating position has secured their seat-belts. If all the passengers are not belted in, AVES vehicle control system 210 activates IVR System 220 and interactive touchscreen 230 to prompt the passengers to fasten their seatbelts. After the user is verified, the destination is confirmed and passengers have fastened their seatbelts, AVES vehicle control system 210 commands autonomous vehicle 20 to begin the trip. AVES vehicle equipment 200 of an autonomous vehicle 20 may be set to a sight-impaired mode by the user via AVES application 300. In sight-impaired mode, AVES vehicle control system 210 communicates with the user via IVR System 220.

In the event that an autonomous vehicle 20 picks up a user for a trip request 504 in an unacceptable condition, the user may indicate the unacceptable condition and reject the autonomous vehicle 20 via the autonomous vehicle's IVR System 220 and/or interactive touchscreen 230. Upon receiving an indication of an unacceptable vehicle condition from AVES vehicle control system 210 of the autonomous vehicle 20, AVES COC automatically assigns a replacement autonomous vehicle 20 at highest priority, and takes the autonomous vehicle 20 in unacceptable condition out of the active pool and directs said autonomous vehicle 20 to a service location.

As a trip progresses, interactive touchscreen 230 displays real-time trip information, including trip route and real-time location on a map, estimated time of arrival, etc. Also, interactive touchscreen 230 may provide a soft key to temporarily halt the trip for a bathroom break, illness, etc., and IVR System 220 may programmed to recognize voice commands to temporarily halt the trip for a bathroom break, illness, etc.

The user may make a trip modification request 505 with altered trip information 507 (e.g., changed intermediate stop location(s) and/or destination location) while in transit by using IVR System 220, interactive touchscreen 230 or AVES application 300. AVES vehicle control system 210 sends the trip modification request 505 with altered trip information 507 to AVES COC 100. Artificial Intelligence System 130 executes the Route Determining Algorithm to determine an altered trip route 608 (including newly estimated trip duration and cost) for fulfilling the modification request 505 based on the altered trip information 507 and information in knowledge base 140, as described above with respect to ride request 504. Computer server 120 determines whether the present autonomous vehicle is capable of fulfilling the trip modification request 505 according to the altered trip route 608, as well as if there is sufficient payment capacity by the requesting user for the altered trip. If the present autonomous vehicle 20 is capable of fulfilling the modification request 505 according to the altered trip route 608, computer server 120 confirms that the user accepts the altered trip route 608 via the IVR system 220, the interactive touchscreen 230 or the AVES application 300, and guides the present autonomous vehicle 20 according to the altered trip route 608. If the present autonomous vehicle 20 is not capable of fulfilling the trip modification request 505 according to the altered trip route 608, computer server 120 selects an alternative autonomous vehicle 20 for fulfilling the trip modification request 505, confirms that the user accepts the alternative autonomous vehicle 20 via the IVR system 220, the interactive touchscreen 230 or the AVES application 30 and implements multi-hop routing to coordinate the present autonomous vehicle 20 and the alternative autonomous vehicle 20 to fulfill the trip modification request 505 according to the altered trip route 608. Artificial Intelligence System 130 executes the Matchmaking Algorithm to select the alternative autonomous vehicle 20 to fulfill the trip modification request 505 based on the altered trip route 608 and information in knowledge base 140, as described above with respect to ride request 504.

The user may trigger an emergency alert 514 by using IVR System 220 or interactive touchscreen 230. For example, IVR System 220 may be programmed to recognize certain keywords to initiate the emergency protocol. IVR system 220 may remain active during the duration of a trip to detect pre-programmed words to initiate the emergency protocol. AVES vehicle control system 210 sends the emergency alert 514 to AVES COC 100 and AVES COC 100 initiates an emergency protocol. AVES COC 100 confirms that there is an emergency via IVR System 220 or interactive touchscreen 230. If AVES COC 100 confirms that there is an emergency or receives no response at all, AVES COC 100 proceeds with the emergency protocol. AVES COC 100 places an emergency 911 call and links the IVR System 220 in the autonomous vehicle to the emergency 911 call. An AVES COC 100 attendant may also be linked to the emergency 911 call if needed to give location information, etc. Also, AVES vehicle control system 210 activates IVR System's 220 microphone and speaker, interior and exterior cameras 260 and the autonomous vehicle's interior lights to facilitate video monitoring. The interior video camera 260 and the IVR System 220 are activated so that an AVES COC 100 attendant can assess the user emergency and so that video and audio data may be stored in the autonomous vehicle's on-board memory. Interactive touchscreen 230 may provide "Go to Police Station" and "Go to Hospital" soft button choices. IVR System 220 may be programmed to recognize certain keywords to confirm an emergency and the type of emergency (e.g., medical emergency). AVES vehicle control system 210 may interrupt the autonomous vehicle's trip and guide the autonomous vehicle 20 to a police station or hospital depending on the user input. An AVES COC 100 attendant will be able to remotely halt or reroute the autonomous vehicle and give the autonomous vehicle's location if the hospital wishes to dispatch an ambulance to meet the autonomous vehicle 20. AVES 10 will also have the ability to directly forward the location information to a future 911 system that can accept such information.

If an autonomous vehicle 20 is suddenly disabled during a trip, AVES vehicle control system 210 initiates a disabled vehicle protocol. AVES vehicle control system 210 will first attempt to guide the autonomous vehicle to a safe location (e.g., at the side of a road), activate the hazard flashers and notify AVES COC 100. AVES COC 100 automatically priority dispatches a substitute autonomous vehicle 20 and establishes a communications link to the autonomous vehicle's passenger(s) via IVR System 220 and interior video camera 260 so that an AVES COC 100 attendant can monitor the situation. This disabled vehicle protocol differs from present automatic vehicle notification systems in that a substitute autonomous vehicle 20 is automatically dispatched, rather than simply notify the transportation network company of the disabled condition of the autonomous vehicle 20.

In the event that AVES COC 100 fails or loses the communication link to AVES vehicle equipment 200, AVES vehicle control system 210 will initiate a disabled system protocol. AVES vehicle control system 210 directs autonomous vehicle 20 to complete the trip in progress, and store the trip billing information in the autonomous vehicle's 20 local AVES memory until the communication link and/or AVES COC 100 is restored to normal operation. Once the communication link and/or AVES COC 100 is restored, AVES vehicle control system 210 sends the trip data to AVES COC 100. AVES vehicle control system 210 directs autonomous vehicle 20 to drive to the nearest fail-safe location or rest location, which are stored in the local AVES memory files. A failure in the GPS system will also cause disabled system protocol to be initiated, with "dead reckoning" (e.g., compass and distance information) used to complete a trip in progress, or a move to a fail-safe location or rest location.

If an autonomous vehicle 20 reaches a desired intermediate stop location or destination location and it is unable to stop (e.g., another vehicle occupying that area, etc.), AVES vehicle control system 210 directs autonomous vehicle 20 to drive slightly past the desired intermediate stop location or destination location for a specified distance before automatically looping back to attempt another stop at the desired intermediate stop location or destination location. AVES vehicle control system 210 activates IVR System 220 to ask the passenger whether they would like to stop before the destination, circle around, stop past the destination, or have an alternative stop location. Once the autonomous vehicle 20 has come to a stop at the desired intermediate stop location or destination location, AVES vehicle control system 210 automatically unlocks the doors, announces the location via IVR System 220 and displays the location via interactive touchscreen 230.

AVES vehicle control system 210 activates IVR System 220 and interactive touchscreen 230 prompts the user to confirm whether the user wishes to terminate the trip, wishes for the autonomous vehicle 20 to wait for the user to return to the autonomous vehicle 20, or wishes to go to a new destination. If the hailing user wishes for the autonomous vehicle 20 to wait for the user to return to the autonomous vehicle 20, AVES application 300 stays active during this period to allow a re-summoning of the autonomous vehicle 20. If, at the conclusion of a trip, AVES vehicle control system 210 does not receive a response to the request for confirmation of the trip's conclusion within a specified time frame, AVES vehicle control system 210 repeats the confirmation attempt at progressively louder volume levels and with flashing of the interior lights. If AVES vehicle control system 210 does not receive a response to the request for confirmation of the trip's conclusion and there is no indication that the doors have been opened, AVES vehicle control system 210 activates an interior video camera and the IVR so that AVES COC 100 can assess whether the user is still present in the autonomous vehicle 20. The interconnection between AVES vehicle control system 210 and the computer system (e.g., CAN bus) of the autonomous vehicle 20, allows AVES vehicle control system 210 to determine when the hailing user has exited the autonomous vehicle 20 (e.g., detect when a vehicle door has opened and closed). If AVES COC 100 detects an incapacitated passenger who is still in the autonomous vehicle 20 and unable to respond, AVES COC 100 initiates the emergency protocol.

The interconnection between AVES vehicle control system 210 and the computer system (e.g., CAN bus) of the autonomous vehicle 20, allows AVES vehicle control system 210 to determine when items have been placed in the trunk of the autonomous vehicle 20 (e.g., detect when a trunk has been opened and closed). At the conclusion of a trip, if AVES vehicle control system 210 determines that the trunk has been opened during the trip, AVES vehicle control system 210 activates IVR System 220 and interactive touchscreen 230 to prompt the passenger(s) to make sure that any personal items have been removed from the trunk and to confirm that they have checked. If AVES vehicle control system 210 determines that the trunk has been opened only once during the trip (thus precluding the possibility that an item could have been placed in the trunk and then subsequently removed), AVES vehicle control system 210 will direct autonomous vehicle 20 remain at the destination location and continue to prompt the passenger(s) to make sure that any personal items have been removed from the trunk. Also, AVES vehicle control system 210 may determine whether items have been placed in the trunk by detecting whether the trunk has been opened and closed. Additionally, AVES vehicle equipment 200 may include camera(s) 260 and/or sensor(s) 270 in the trunk space of the autonomous vehicle, which are connected to AVES vehicle control system 210, for determining whether items have been left behind in the trunk. If, after a specified period of time, AVES vehicle control system 210 does not receive confirmation that the passenger(s) checked the trunk, AVES vehicle control system 210 activates a video camera and lights in the trunk so that AVES COC 100 can assess whether any items are in the trunk. If an item is left behind in the trunk, the passenger is notified. Also, sensor(s) 270 (e.g., infrared sensors) in the trunk may be used to detect the presence of items in the trunk space.

AVES 10 takes into consideration the security dangers of autonomous vehicles 20 being requested to drive into "restricted" areas. Just as the F.A.A. designates "no-fly" zones around arenas, special events, etc., AVES 10 can also refuse to accept trip requests 504 to enter certain known restricted areas as a matter of course. Areas that are declared temporarily restricted by governing authorities (e.g., parades, marathons, etc.) are also accommodated by AVES COC 100.

Trip requests 504 to and from locations that have access controls (e.g., gate operators, garage doors, guard stations, etc.) will require additional capabilities that AVES vehicle equipment 200 can be configured to provide. For remote-controlled access systems, AVES vehicle equipment 200 includes 300-400 MHz band transmitters that can operate the controls using direct radio transmission of Security+2.0 (rolling code), Intellicode, or other gate or garage door remote opener radio protocols to provide a seamless interface. AVES COC 100 may store access codes to be stored as part of user record 500. Alternatively, a user may provide access codes via IVR System 220 and interactive touchscreen 230. For those locations that have live security personnel, AVES vehicle equipment 200 include external loudspeakers and external microphones to allow a user to communicate with security personnel via IVR System 220 without having to open a window. Additionally, if an autonomous vehicle 20 is blocked by a gate (or similar impediment) at the pickup location, AVES COC 100 may communicate with the user via AVES application 300 to inform the user that the autonomous vehicle is waiting at the gate to be admitted.

AVES COC 100 may be integrated into a transportation network company's central facility or may operate as a "stand alone" facility that creates a "fleet of fleets" virtually combining existing independent fleets into a single virtual fleet. AVES COC 100 may manage transportation services (e.g., dispatch, billing, etc.) for multiple transportation companies in a geographical area. AVES COC 100 may limit transportation services (e.g., dispatch, billing, etc.) for a particular transportation company only to those autonomous vehicles 20 in that particular transportation company's fleet. The sharing of fleet resources may be invisible to the user in a similar way that airline "code-sharing" arrangements allow a user to book a trip through a particular airline, but the actual trip is fulfilled by another airline. Alternatively, the entire virtual fleet may consist of individually owned single vehicles, or individually owned fleets of vehicles.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. An Autonomous Vehicle Enhancement System (AVES) for managing a fleet of autonomous vehicles in an existing or virtual transportation network, comprising:
    AVES vehicle equipment installed on each autonomous vehicle; and
    an AVES Central Operations Center (COC) in communication with the AVES vehicle equipment on each autonomous vehicle;
    wherein the AVES COC monitors the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
    wherein the AVES COC assigns autonomous vehicles in the fleet to an active pool based on pre-defined criteria comprising if the autonomous vehicles are available, are in acceptable operational state, are in acceptable condition and have acceptable fuel/power-charge level;
    wherein the AVES COC receives trip requests from hailing users, selects autonomous vehicles from the active pool to respond to trip requests and guides the selected autonomous vehicles to the hailing users;
    wherein the AVES COC guides autonomous vehicles in the fleet, which are not in acceptable operational state or condition, to service locations for maintenance service;
    wherein the AVES COC guides autonomous vehicles in the fleet, which do not have acceptable fuel/power-charge level, to fueling/power-charging stations for fueling/power-charging;
    wherein the AVES COC guides autonomous vehicles in the active pool, which are not assigned to respond to trip requests from hailing users, to standby locations throughout the transportation network's geographic area; and
    wherein the real-time vehicle operational state of each autonomous vehicle in the fleet includes information regarding the operational state of the mechanical and electrical systems of the autonomous vehicle, and the real-time vehicle condition of each autonomous vehicle in the fleet includes information regarding state of cleanliness of the autonomous vehicle.

2. The Autonomous Vehicle Enhancement System (AVES) according to claim 1,
    wherein the AVES COC comprises an Artificial Intelligence System including a knowledge base; and wherein the Artificial Intelligence System executes a Vehicle Distribution Optimization Algorithm to determine standby locations for the autonomous vehicles in the fleet.

3. The Autonomous Vehicle Enhancement System (AVES) according to claim 2,
wherein the knowledge base includes at least one of real-time vehicle location data for the autonomous vehicles in the active pool, historical information regarding trip requests, real-time information regarding trip requests and information regarding scheduled events in the transportation network's geographic area; and
wherein the Vehicle Distribution Optimization Algorithm uses the knowledge base to determine standby locations for the autonomous vehicles in the transportation network's geographic area to achieve a vehicle distribution that is optimally suited for fulfilling potential trip requests.

4. The Autonomous Vehicle Enhancement System (AVES) according to claim 3, wherein the real-time information regarding trip requests and information regarding scheduled events in the transportation network's geographic area are received by the AVES COC from public messaging systems and/or the AVES vehicle equipment installed on the autonomous vehicles in the fleet.

5. The Autonomous Vehicle Enhancement System (AVES) according to claim 1,
wherein the AVES COC comprises an Artificial Intelligence System including a knowledge base; and
wherein the Artificial Intelligence System executes the Matchmaking Algorithm by using the knowledge base to select autonomous vehicles from the active pool that are optimally suited to respond to the trip requests.

6. The Autonomous Vehicle Enhancement System (AVES) according to claim 5, wherein the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s) and vehicle description for each of the autonomous vehicles in the fleet.

7. The Autonomous Vehicle Enhancement System (AVES) according to claim 1, wherein standby locations include fueling/power-charging stations, street parking spaces, parking garages and taxi queues.

8. The Autonomous Vehicle Enhancement System (AVES) according to claim 1, wherein the real-time vehicle availability of each autonomous vehicle in the fleet includes information regarding whether the autonomous vehicle is in the active pool, has been assigned to respond a trip request from a hailing user, is waiting or en route to pickup a hailing user for an assigned trip request, has picked up a hailing user for an assigned trip request or has dropped of a hailing user after completion of an assigned trip request.

9. The Autonomous Vehicle Enhancement System (AVES) according to claim 1, wherein the real-time vehicle fuel/power-charge level of each autonomous vehicle in the fleet includes information regarding at least one of a vehicle travel distance range, a percentage of fuel tank or electrical battery capacity available and units of available power or energy.

10. The Autonomous Vehicle Enhancement System (AVES) according to claim 1, wherein the AVES COC is configured to select and substitute a newly available autonomous vehicle in the active pool to respond to a trip request of the trip requests and guide the newly available autonomous vehicle to a hailing user of the hailing users after an initial autonomous vehicle of the autonomous vehicles was selected to respond to the trip request and at least partly guided to the hailing user if the AVES COC determines that the newly available autonomous vehicle is better suited for fulfilling the trip request of the hailing user.

11. The Autonomous Vehicle Enhancement System (AVES) according to claim 10, wherein the AVES COC is configured to refrain from selecting and substituting the newly available autonomous vehicle for fulfilling the trip request if the scheduled pickup time for the trip request is within a specified period of time and/or if the information about the initial autonomous vehicle was sent to the hailing user and/or an application installed on a computing device accessible by the hailing user.

12. The Autonomous Vehicle Enhancement System (AVES) according to claim 1,
wherein the information regarding the state of cleanliness of the autonomous vehicle comprises information regarding a condition of the interior of the autonomous vehicle and/or a condition of the user inside the autonomous vehicle;
wherein the AVES vehicle equipment includes an interior video camera for sending images of the interior of the autonomous vehicle to the AVES COC so that the condition of the interior of the autonomous vehicle and/or the condition of the user inside the autonomous vehicle can be inspected.

13. The Autonomous Vehicle Enhancement System (AVES) according to claim 12, wherein the condition of the interior of the autonomous vehicle comprises the interior of the autonomous vehicle being soiled, littered, in disrepair, and/or containing an item belonging to a previous user.

14. The Autonomous Vehicle Enhancement System (AVES) according to claim 13, wherein the AVES COC is configured to remove the autonomous vehicle from the active pool if the autonomous vehicle contains the item belonging to the previous user, wherein the AVES COC is configured to guide the autonomous vehicle to a service location for retrieval of the item belonging to the previous user, and wherein the AVES COC is configured to notify the previous user that the item belonging to the previous user was forgotten.

15. The Autonomous Vehicle Enhancement System (AVES) according to claim 12, wherein the condition of the user inside the autonomous vehicle comprises the user remaining in the interior of the autonomous vehicle following fulfillment of the trip request, and wherein the AVES COC is configured to remove the autonomous vehicle from the active pool if the condition of the user inside the autonomous vehicle is that the user remains in the interior of the autonomous vehicle following fulfillment of the trip request.

16. An Autonomous Vehicle Enhancement System (AVES) for managing a fleet of autonomous vehicles and dispatching the autonomous vehicles in the fleet to users, comprising:
AVES vehicle equipment installed on each autonomous vehicle;
AVES applications installed on computing devices accessible by the users; and
an AVES Central Operations Center (COC) in communication with the AVES vehicle equipment on each autonomous vehicle and the AVES applications installed on the computing devices;
wherein the AVES COC receives a unique vehicle ID, real-time vehicle location, real-time vehicle availability, real-time vehicle operational state, real-time vehicle condition and real-time vehicle fuel/power-charge level for each autonomous vehicle from the AVES vehicle equipment installed on each autonomous vehicle;

wherein the AVES COC receives a trip request from a hailing user via a selected AVES application on a selected computing device, the trip request including a unique user ID associated with the hailing user and trip information including pickup location, pickup date/time, destination location, and any intermediate stop location(s);

wherein the AVES COC determines a trip route based on the trip information for the trip request;

wherein the AVES COC selects one of the autonomous vehicles to fulfill the trip request based on the trip route, real-time vehicle location, real-time vehicle availability, real-time vehicle operational state, real-time vehicle condition and real-time vehicle fuel/power-charge level;

wherein the AVES COC generates a unique trip ID for the trip request, and associates the user ID for the hailing user and the vehicle ID for the selected autonomous vehicle with the unique trip ID; and wherein the AVES COC sends the trip information and/or trip route to the AVES vehicle equipment of the selected autonomous vehicle to guide the selected autonomous vehicle to the pickup location at the pickup time.

17. The Autonomous Vehicle Enhancement System (AVES) according to claim 16,
wherein the AVES COC comprises an Artificial Intelligence System including a knowledge base; and
wherein the Artificial Intelligence System executes a Route Determining Algorithm to determine the trip route for the trip request.

18. The Autonomous Vehicle Enhancement System (AVES) according to claim 17,
wherein the knowledge base includes at least one of historical traffic conditions, real-time traffic conditions, scheduled road closures, scheduled events and scheduled construction; and
wherein the Artificial Intelligence System executes the Route Determining Algorithm by using the trip information and knowledge base to determine the trip route that is optimally suited for fulfilling the trip request.

19. The Autonomous Vehicle Enhancement System (AVES) according to claim 18, wherein the real-time traffic conditions, scheduled road closures, scheduled events and scheduled construction are received by the AVES COC from public messaging systems and/or the AVES vehicle equipment installed on the autonomous vehicles in the fleet.

20. The Autonomous Vehicle Enhancement System (AVES) according to claim 17, wherein the Artificial Intelligence System executes a Matchmaking Algorithm to select the autonomous vehicle that is optimally suited to fulfill the trip request.

21. The Autonomous Vehicle Enhancement System (AVES) according to claim 20,
wherein the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s) and vehicle description for each of the autonomous vehicles in the fleet; and wherein the Matchmaking Algorithm uses the determined trip route and knowledge base to select the autonomous vehicle that is optimally suited for fulfilling the trip request.

22. The Autonomous Vehicle Enhancement System (AVES) according to claim 21, wherein if, before the completion of a scheduled pickup date/time for the trip request, the Matchmaking Algorithm determines that a newly available autonomous vehicle is better suited for fulfilling the trip request than the previously selected autonomous vehicle, the Artificial Intelligence System selects the newly available autonomous vehicle to fulfill the trip request in lieu of the previously selected vehicle.

23. The Autonomous Vehicle Enhancement System (AVES) according to claim 16, wherein if the trip request exceeds an operational range of any available autonomous vehicle in the fleet, the AVES COC implements sequential multi-hop routing to select and coordinate two or more autonomous vehicles to fulfill the trip request.

24. The Autonomous Vehicle Enhancement System (AVES) according to claim 16, wherein if the trip request exceeds a passenger capacity of any available autonomous vehicle in the fleet, the AVES COC implements simultaneous multi-vehicle routing to select and coordinate two or more autonomous vehicles to fulfill the trip request.

25. The Autonomous Vehicle Enhancement System (AVES) according to claim 16, wherein the AVES COC selects and unilaterally, unequivocally and automatically assigns the autonomous vehicle to fulfill the trip request.

26. The Autonomous Vehicle Enhancement System (AVES) according to claim 16,
wherein the AVES COC generates a trip PIN corresponding to the unique trip ID for the trip request; and
wherein the AVES COC sends the unique trip ID and corresponding unique trip PIN to the AVES vehicle equipment of the selected autonomous vehicle and to the selected AVES application on the selected computing device of the hailing user.

27. The Autonomous Vehicle Enhancement System (AVES) according to claim 16,
wherein the selected AVES application transmits a signal encoded with the unique trip ID via the selected computing device;
wherein the AVES vehicle equipment includes an antenna that scans for the AVES application's signal encoded with the unique trip ID;
wherein the AVES vehicle equipment detects the AVES application's signal encoded with the unique trip ID and guides the autonomous vehicle toward the selected computing device, stops the autonomous vehicle, unlocks the doors of the autonomous vehicle and waits for the hailing user to enter the autonomous vehicle.

28. The Autonomous Vehicle Enhancement System (AVES) according to claim 16,
wherein the AVES vehicle equipment includes a signal emitter that transmits a signal encoded with the unique trip ID; and
wherein the selected AVES application activates a camera on the selected computing device, senses the signal encoded with the unique trip ID and identifies on an image captured by the camera the selected autonomous vehicle transmitting the signal encoded with the unique trip ID.

29. The Autonomous Vehicle Enhancement System (AVES) according to claim 16,
wherein the AVES COC stores a vehicle description for each autonomous vehicle in the fleet; and wherein the AVES COC sends the vehicle description for the selected autonomous vehicle to the selected AVES application on the selected computing device of the hailing user.

30. The Autonomous Vehicle Enhancement System (AVES) according to claim 16,
wherein the AVES vehicle equipment includes an AVES vehicle control system operably connected to a vehicle computer system of the autonomous vehicle; and
wherein the AVES vehicle control system transmits the trip information and/or trip route for the trip request to the vehicle computer system for guiding the autonomous vehicle to the pickup location at the pickup time.

31. The Autonomous Vehicle Enhancement System (AVES) according to claim 16,
wherein the AVES vehicle equipment includes an AVES vehicle control system operably connected to a vehicle computer system of the autonomous vehicle; and
wherein the AVES vehicle control system transmits driving commands to the vehicle computer system of autonomous vehicle based on the trip information and/or trip route for guiding the autonomous vehicle to the pickup location at the pickup time.

32. The Autonomous Vehicle Enhancement System (AVES) according to claim 16, wherein the AVES vehicle equipment includes an interior video camera for sending images of the interior of the autonomous vehicle to the AVES COC so that a condition of the interior of the autonomous vehicle and/or a condition of the user inside the autonomous vehicle can be inspected.

33. The Autonomous Vehicle Enhancement System (AVES) according to claim 16, wherein the AVES vehicle equipment includes an Interactive Voice Response (IVR) system with a microphone and speaker and/or an interactive touchscreen for the user inside the autonomous vehicle and the AVES COC to communicate.

34. The Autonomous Vehicle Enhancement System (AVES) according to claim 33, wherein the IVR system and/or the interactive touchscreen identifies the unique trip ID and prompts the user for the unique trip PIN to authenticate the trip request.

35. The Autonomous Vehicle Enhancement System (AVES) according to claim 33,
wherein at least one of the IVR system, the interactive touchscreen and the AVES application receives a modification request from the hailing user to alter the trip information and sends the modification request to alter the trip information to the AVES COC;
wherein the AVES COC determines whether the selected autonomous vehicle is capable of fulfilling the modification request and determines an altered trip route;
wherein if the selected autonomous vehicle is capable of fulfilling the modification request to alter the trip information and there is sufficient payment capacity, the AVES COC confirms that the user accepts the altered trip route via the IVR system, the interactive touchscreen or the AVES application and guides the selected autonomous vehicle according to the altered trip route; and
wherein if the selected autonomous vehicle is not capable of fulfilling the modification request to alter the trip information, the AVES COC selects an alternative autonomous vehicle for fulfilling the modification request to alter the trip information, confirms that the user accepts the alternative autonomous vehicle via the IVR system, the interactive touchscreen or the AVES application and implements multi-hop routing to coordinate the selected autonomous vehicle and the alternative autonomous vehicle to fulfill the trip request according to the altered trip route.

36. The Autonomous Vehicle Enhancement System (AVES) according to claim 33,
wherein at least one of the IVR system, the interactive touchscreen and the AVES application receives a user emergency alert and sends the user emergency alert to the AVES COC;
wherein the AVES COC initiates an emergency protocol where the interior video camera and the IVR are activated so that AVES COC can assess the user emergency; and
wherein the AVES COC reroutes the autonomous vehicle to a hospital, police station or fire station, and/or calls for emergency response service.

37. The Autonomous Vehicle Enhancement System (AVES) according to claim 16, wherein the AVES vehicle equipment is operably connected to a computer system of the autonomous vehicle to control unlocking/locking of doors of the autonomous vehicle and to detect whether the doors of the autonomous vehicle are open/closed.

38. A method of managing a fleet of autonomous vehicles in a transportation network and dispatching the autonomous vehicles in the fleet to transportation network users, comprising the steps of:
providing an Autonomous Vehicle Enhancement System (AVES) comprising an AVES Central Operations Center (COC) in communication with AVES vehicle equipment installed on each autonomous vehicle in the fleet and with AVES applications installed on computing devices accessible by the users;
the AVES COC monitoring the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
the AVES Central Operations Center (COC) assigning autonomous vehicles in the fleet to an active pool if the autonomous vehicles are available, are in acceptable operational state, are in acceptable condition and have acceptable fuel/power-charge level;
the AVES COC receiving trip requests from hailing users, selecting autonomous vehicles from the active pool to respond to the trip requests and guiding the selected autonomous vehicles to the hailing users;
the AVES COC guiding autonomous vehicles in the fleet, which are not in acceptable operational state or condition, to service locations for maintenance service;
the AVES COC guiding autonomous vehicles in the fleet, which do not have acceptable fuel/power-charge level, to fueling/power-charging stations for fueling/power-charging;
the AVES COC guiding autonomous vehicles in the active pool, which are not assigned to respond to trip requests from hailing users, to standby locations throughout the transportation network's geographic area;
wherein the real-time vehicle operational state of each autonomous vehicle in the fleet includes information regarding the operational state of the mechanical and electrical systems of the autonomous vehicle, and the real-time vehicle condition of each autonomous vehicle in the fleet includes information regarding state of cleanliness of the autonomous vehicle.

39. The method according to claim 38,
wherein the AVES COC comprises an Artificial Intelligence System including a knowledge base; and
the Artificial Intelligence System executing a Vehicle Distribution Optimization Algorithm to determine standby locations for the autonomous vehicles in the fleet.

40. The method according to claim 39,
wherein the knowledge base includes at least one of real-time vehicle location data for the autonomous vehicles in the active pool, historical information regarding trip requests, real-time information regarding trip requests and information regarding scheduled events in the transportation network's geographic area; and
the Vehicle Distribution Optimization Algorithm using the knowledge base to determine standby locations for the autonomous vehicles in the transportation network's geographic area to achieve a vehicle distribution that is optimally suited for fulfilling trip requests.

41. The method according to claim 40, wherein the real-time information regarding trip requests and information regarding scheduled events in the transportation network's geographic area are received by the AVES COC from public messaging systems, the AVES applications installed on computing devices accessible by the users or the AVES vehicle equipment installed on the autonomous vehicles in the fleet.

42. The method according to claim 38,
wherein the AVES COC comprises an Artificial Intelligence System including a knowledge base; and
the Artificial Intelligence System executing the Matchmaking Algorithm by using the knowledge base to select autonomous vehicles from the active pool that are optimally suited to respond to the trip requests.

43. The method according to claim 42, wherein the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s), vehicle description for each of the autonomous vehicles in the fleet.

44. The method according to claim 38, wherein standby locations include fueling/power-charging stations, street parking spaces, parking garages and taxi queues.

45. The method according to claim 38, wherein the real-time vehicle availability of each autonomous vehicle in the fleet includes information regarding whether the autonomous vehicle is in the active pool, has been assigned to respond a trip request from a hailing user, is waiting or en route to pickup a hailing user for an assigned trip request, has picked up a hailing user for an assigned trip request or has dropped off a hailing user after completion of an assigned trip request.

46. The method according to claim 38, wherein the real-time vehicle fuel/power-charge level of each autonomous vehicle in the fleet includes information regarding at least one of a vehicle travel distance range, a percentage of fuel tank or electrical battery capacity available and units of available power or energy.

47. An Autonomous Vehicle Enhancement System (AVES) for managing a fleet of autonomous vehicles in an existing or virtual transportation network, comprising:
AVES vehicle equipment installed on each autonomous vehicle; and
an AVES Central Operations Center (COC) in communication with the AVES vehicle equipment on each autonomous vehicle;
wherein the AVES COC monitors the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
wherein the AVES COC assigns autonomous vehicles in the fleet to an active pool based on pre-defined criteria comprising if the autonomous vehicles are available, are in acceptable operational state, are in acceptable condition and have acceptable fuel/power-charge level;
wherein the AVES COC receives trip requests from hailing users, selects autonomous vehicles from the active pool to respond to trip requests and guides the selected autonomous vehicles to the hailing users;
wherein the AVES COC guides autonomous vehicles in the fleet, which are not in acceptable operational state or condition, to service locations for maintenance service;
wherein the AVES COC guides autonomous vehicles in the fleet, which do not have acceptable fuel/power-charge level, to fueling/power-charging stations for fueling/power-charging;
wherein the AVES COC guides autonomous vehicles in the active pool, which are not assigned to respond to trip requests from hailing users, to standby locations throughout the transportation network's geographic area;
wherein the AVES COC comprises an Artificial Intelligence System including a knowledge base; and
wherein the Artificial Intelligence System executes a Vehicle Distribution Optimization Algorithm to determine standby locations for the autonomous vehicles in the fleet.

48. The Autonomous Vehicle Enhancement System (AVES) according to claim 47,
wherein the knowledge base includes at least one of real-time vehicle location data for the autonomous vehicles in the active pool, historical information regarding trip requests, real-time information regarding trip requests and information regarding scheduled events in the transportation network's geographic area; and
wherein the Vehicle Distribution Optimization Algorithm uses the knowledge base to determine standby locations for the autonomous vehicles in the transportation network's geographic area to achieve a vehicle distribution that is optimally suited for fulfilling potential trip requests.

49. The Autonomous Vehicle Enhancement System (AVES) according to claim 48, wherein the real-time information regarding trip requests and information regarding scheduled events in the transportation network's geographic area are received by the AVES COC from public messaging systems and/or the AVES vehicle equipment installed on the autonomous vehicles in the fleet.

50. An Autonomous Vehicle Enhancement System (AVES) for managing a fleet of autonomous vehicles in an existing or virtual transportation network, comprising:
AVES vehicle equipment installed on each autonomous vehicle; and an AVES Central Operations Center (COC) in communication with the AVES vehicle equipment on each autonomous vehicle;
wherein the AVES COC monitors the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
wherein the AVES COC assigns autonomous vehicles in the fleet to an active pool based on pre-defined criteria comprising if the autonomous vehicles are available, are in acceptable operational state, are in acceptable condition and have acceptable fuel/power-charge level;
wherein the AVES COC receives trip requests from hailing users, selects autonomous vehicles from the active pool to respond to trip requests and guides the selected autonomous vehicles to the hailing users;
wherein the AVES COC guides autonomous vehicles in the fleet, which are not in acceptable operational state or condition, to service locations for maintenance service;
wherein the AVES COC guides autonomous vehicles in the fleet, which do not have acceptable fuel/power-charge level, to fueling/power-charging stations for fueling/power-charging;
wherein the AVES COC guides autonomous vehicles in the active pool, which are not assigned to respond to trip requests from hailing users, to standby locations throughout the transportation network's geographic area;
wherein the AVES COC comprises an Artificial Intelligence System including a knowledge base; and
wherein the Artificial Intelligence System executes the Matchmaking Algorithm by using the knowledge base to select autonomous vehicles from the active pool that are optimally suited to respond to the trip requests.

51. The Autonomous Vehicle Enhancement System (AVES) according to claim 50, wherein the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s) and vehicle description for each of the autonomous vehicles in the fleet.

52. A method of managing a fleet of autonomous vehicles in a transportation network and dispatching the autonomous vehicles in the fleet to transportation network users, comprising the steps of:
providing an Autonomous Vehicle Enhancement System (AVES) comprising an AVES Central Operations Center (COC) in communication with AVES vehicle equipment installed on each autonomous vehicle in the fleet and with AVES applications installed on computing devices accessible by the users;
the AVES COC monitoring the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
the AVES Central Operations Center (COC) assigning autonomous vehicles in the fleet to an active pool if the autonomous vehicles are available, are in acceptable operational state, are in acceptable condition and have acceptable fuel/power-charge level;
the AVES COC receiving trip requests from hailing users, selecting autonomous vehicles from the active pool to respond to the trip requests and guiding the selected autonomous vehicles to the hailing users;
the AVES COC guiding autonomous vehicles in the fleet, which are not in acceptable operational state or condition, to service locations for maintenance service;
the AVES COC guiding autonomous vehicles in the fleet, which do not have acceptable fuel/power-charge level, to fueling/power-charging stations for fueling/power-charging;
the AVES COC guiding autonomous vehicles in the active pool, which are not assigned to respond to trip requests from hailing users, to standby locations throughout the transportation network's geographic area;
wherein the AVES COC comprises an Artificial Intelligence System including a knowledge base; and
the Artificial Intelligence System executing a Vehicle Distribution Optimization Algorithm to determine standby locations for the autonomous vehicles in the fleet.

53. The method according to claim 52,
wherein the knowledge base includes at least one of real-time vehicle location data for the autonomous vehicles in the active pool, historical information regarding trip requests, real-time information regarding trip requests and information regarding scheduled events in the transportation network's geographic area; and
the Vehicle Distribution Optimization Algorithm using the knowledge base to determine standby locations for the autonomous vehicles in the transportation network's geographic area to achieve a vehicle distribution that is optimally suited for fulfilling trip requests.

54. The method according to claim 53, wherein the real-time information regarding trip requests and information regarding scheduled events in the transportation network's geographic area are received by the AVES COC from public messaging systems, the AVES applications installed on computing devices accessible by the users or the AVES vehicle equipment installed on the autonomous vehicles in the fleet.

55. A method of managing a fleet of autonomous vehicles in a transportation network and dispatching the autonomous vehicles in the fleet to transportation network users, comprising the steps of:
providing an Autonomous Vehicle Enhancement System (AVES) comprising an AVES Central Operations Center (COC) in communication with AVES vehicle equipment installed on each autonomous vehicle in the fleet and with AVES applications installed on computing devices accessible by the users;
the AVES COC monitoring the fleet of autonomous vehicles via the AVES vehicle equipment installed on each autonomous vehicle to determine real-time vehicle location, real-time vehicle availability, real-time vehicle operational state, real-time vehicle condition and real-time vehicle fuel/power-charge level of each autonomous vehicle in the fleet;
the AVES Central Operations Center (COC) assigning autonomous vehicles in the fleet to an active pool if the autonomous vehicles are available, are in acceptable operational state, are in acceptable condition and have acceptable fuel/power-charge level;

the AVES COC receiving trip requests from hailing users, selecting autonomous vehicles from the active pool to respond to the trip requests and guiding the selected autonomous vehicles to the hailing users;

the AVES COC guiding autonomous vehicles in the fleet, which are not in acceptable operational state or condition, to service locations for maintenance service;

the AVES COC guiding autonomous vehicles in the fleet, which do not have acceptable fuel/power-charge level, to fueling/power-charging stations for fueling/power-charging;

the AVES COC guiding autonomous vehicles in the active pool, which are not assigned to respond to trip requests from hailing users, to standby locations throughout the transportation network's geographic area;

wherein the AVES COC comprises an Artificial Intelligence System including a knowledge base; and the Artificial Intelligence System executing the Matchmaking Algorithm by using the knowledge base to select autonomous vehicles from the active pool that are optimally suited to respond to the trip requests.

56. The method according to claim 55, wherein the knowledge base includes user preference(s) and at least one of real-time vehicle location data, real-time vehicle availability data, real-time vehicle operational state, real-time vehicle condition data, real-time vehicle fuel/power-charge level indication, vehicle owner specified restriction(s), vehicle description for each of the autonomous vehicles in the fleet.

\* \* \* \* \*

UNITED STATES PATENT AND TRADEMARK OFFICE
CERTIFICATE OF CORRECTION

PATENT NO. : 10,739,149 B2  
APPLICATION NO. : 15/973987  
DATED : August 11, 2020  
INVENTOR(S) : Arnold Chase et al.

Page 1 of 1

It is certified that error appears in the above-identified patent and that said Letters Patent is hereby corrected as shown below:

In the Claims

Claim 8, Column 25, Line 54, replace "of" with -- off --.

Signed and Sealed this
Twenty-second Day of December, 2020

Andrei Iancu
*Director of the United States Patent and Trademark Office*